US012468237B2

(12) United States Patent
Katagiri

(10) Patent No.: US 12,468,237 B2
(45) Date of Patent: Nov. 11, 2025

(54) IMAGE FORMING APPARATUS

(71) Applicant: Konica Minolta, Inc., Tokyo (JP)

(72) Inventor: Tatsuya Katagiri, Hino (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 18/629,112

(22) Filed: Apr. 8, 2024

(65) Prior Publication Data

US 2024/0337961 A1 Oct. 10, 2024

(30) Foreign Application Priority Data

Apr. 10, 2023 (JP) ................................ 2023-063551

(51) Int. Cl.

| | |
|---|---|
| ***G03G 15/01*** | (2006.01) |
| ***G03G 15/00*** | (2006.01) |
| ***G03G 15/08*** | (2006.01) |
| ***G06K 15/00*** | (2006.01) |
| ***G06K 15/02*** | (2006.01) |

(52) U.S. Cl.

CPC ..... *G03G 15/0121* (2013.01); *G03G 15/0189* (2013.01); *G03G 15/0865* (2013.01); *G03G 15/0879* (2013.01); *G03G 15/0891* (2013.01); *G03G 15/556* (2013.01); *G03G 15/6517* (2013.01); *G06K 15/022* (2013.01); *G06K 15/4075* (2013.01)

(58) Field of Classification Search

CPC . G03G 15/0121; G03G 15/0865–0872; G03G 15/0877; G03G 15/0879; G03G 15/6517; G03G 15/652; G03G 15/237; G03G 15/556; G03G 2215/00455; G03G 2215/0663; G03G 2215/0665; G03G 2215/0668; G03G 2215/067; G06K 15/022; G06K 15/4075

See application file for complete search history.

(56) References Cited

U.S. PATENT DOCUMENTS

| | | | | |
|---|---|---|---|---|
| 6,397,019 B1 * | 5/2002 | Kasuga | G03G 15/0856 | 399/258 |
| 10,386,770 B2 * | 8/2019 | Soda | G03G 15/0879 | |
| 10,527,996 B2 * | 1/2020 | Soda | G03G 15/0893 | |
| 2007/0230974 A1 * | 10/2007 | Ohkawa | G03G 15/0872 | 399/27 |
| 2008/0212989 A1 * | 9/2008 | Nagata | G03G 15/0886 | 399/61 |
| 2016/0041498 A1 * | 2/2016 | Terai | G03G 15/0865 | 399/262 |
| 2016/0170356 A1 * | 6/2016 | Mabuchi | G03G 15/0872 | 399/27 |

(Continued)

FOREIGN PATENT DOCUMENTS

JP 2020154015 A 9/2020

*Primary Examiner* — Carla J Therrien

(74) *Attorney, Agent, or Firm* — CANTOR COLBURN LLP

(57) ABSTRACT

An image forming apparatus by which a toner image is formable on a continuous sheet includes a developing device that develops a latent image formed on an image bearing member to form a toner image, and a toner container that contains a toner to be supplied to the developing device, and is attachable to and detachable from the image forming apparatus, wherein a plurality of the toner containers containing toners of a same color are arranged.

16 Claims, 13 Drawing Sheets

(56) References Cited

U.S. PATENT DOCUMENTS

| | | | | |
|---|---|---|---|---|
| 2016/0259286 | A1* | 9/2016 | Akiba | G03G 15/556 |
| 2018/0275567 | A1* | 9/2018 | Kashihara | G03G 15/5029 |
| 2020/0117117 | A1* | 4/2020 | Nohara | G03G 15/0868 |

* cited by examiner

IMAGE FORMING APPARATUS

CROSS-REFERENCE TO RELATED APPLICATIONS

The present invention claims priority under 35 U.S.C. § 119 to Japanese patent Applications No. 2023-063551 filed on Apr. 10, 2023, the entire content of which is incorporated herein by reference.

BACKGROUND OF THE INVENTION

Technical Field

The present invention relates to an image forming apparatus. In particular, the present invention relates to an image forming apparatus that forms toner images on a continuous recording medium.

Description of Related Art

An image forming apparatus that forms toner images formed of a toner on a continuous sheet such as a roll sheet is known. For example, Japanese Unexamined Patent Publication No. 2020-154015 describes an image forming apparatus in which a plurality of developing devices that form toner images on a sheet are included and in which toner bottles respectively containing toners of the same colors as those of the respective developing devices are attachably and detachably provided.

In the image forming apparatus described in Japanese Unexamined Patent Publication No. 2020-154015, in a case in which a toner in a toner bottle runs out during printing, image formation must be temporarily stopped, and restarted after the toner bottle is replaced. In order to continue image formation without stopping the image forming apparatus, the toner bottle must be replaced before a toner in the developing device runs out, and a user must constantly check a remaining amount of the toner in the developing device. Thus, there is a problem that the labor cost is increased, and productivity is degraded.

On the other hand, it is conceivable to increase a toner containing amount such that a toner bottle does not have to be replaced in the middle of printing. However, when the size of the toner bottle is increased, the following problem arises. First, the toner bottle usually has the structure in which a toner is discharged from a bottle opening while the toner bottle is rotated, during an operation of the image forming apparatus. Therefore, when the size of the toner bottle is increased, the weight of the toner bottle is increased, and a larger torque is required of the motor that rotates the toner bottle. Therefore, in a case in which the same motor as the motor that rotates a toner bottle of the conventional size is used, a torque of the motor is insufficient. Therefore, the toner bottle is not stably rotated. Thus, image quality may be degraded due to shortage of a toner in the developing device.

Second, since the opening size of an opening through which a toner bottle discharges a toner is restricted, when the toner containing amount of the toner bottle is increased, the amount of a toner to be conveyed to the opening per unit rotation amount of the toner bottle is larger than that of the toner bottle of the conventional size. Therefore, the toner is likely to be aggregated near the opening. When the aggregated toner is formed on a sheet, the aggregated toner comes off after fixing, and an image defect occurs. Further, the aggregated toner may clog as a lump in a transfer path such as the path between a photosensitive drum and a cleaning blade, and an image including a white streak to which the toner is not transferred may be formed at the location of the lump.

Third, since the size and weight of the toner bottle are increased, a work load for attachment of the toner bottle to the image forming apparatus by a user is increased, and workability is degraded. In particular, in a case in which the toner bottle is arranged in an upper part of the image forming apparatus, it is necessary to lift the toner bottle to its height and results in poor work efficiency.

SUMMARY OF THE INVENTION

According to one aspect of the present invention, an image forming apparatus by which a toner image is formable on a continuous sheet, includes a developing device that develops a latent image formed on an image bearing member to form a toner image, and a toner container that contains a toner to be supplied to the developing device, and is attachable to and detachable from the image forming apparatus, wherein a plurality of the toner containers containing toners of a same color are arranged.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION

Figure 1:
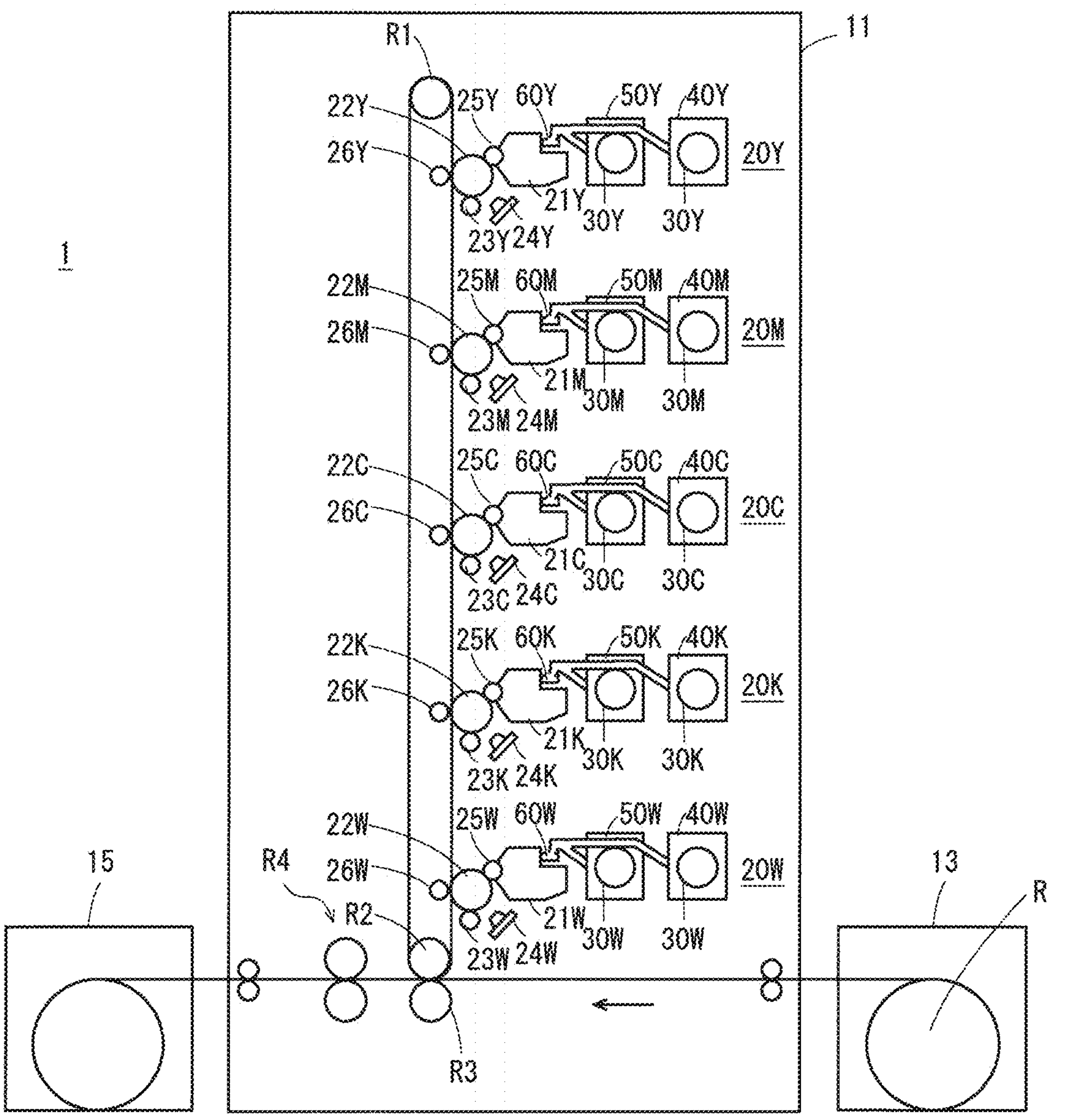
FIG. 1 is a diagram illustrating one example of the schematic inner configuration of an image forming apparatus in one embodiment of the present invention.

Hereinafter, one or more embodiments of the present invention will be described with reference to the drawings. However, the scope of the invention is not limited to the disclosed embodiments.

An image forming apparatus in embodiments of the present invention will be described below with reference to the drawings. In the following description, the same components are denoted by the same reference numerals. Their names and functions are the same. Therefore, a detailed description thereof will not be repeated.

FIG. 1 is a diagram illustrating one example of the schematic inner configuration of an image forming apparatus in one embodiment of the present invention. FIG. 1 illustrates members necessary for description of the present invention, and the image forming apparatus of the present invention is not limited to the example illustrated in FIG. 1. With reference to FIG. 1, the image forming apparatus 1 includes an image forming section 11, a sheet feed device 13 and a winding device 15. The sheet feed device 13 is arranged at a position farther upstream than the image forming section 11, and the winding device 15 is arranged at a position farther downstream than the image forming section 11 in a sheet conveyance direction. The sheet feed device 13 sends a roll sheet R to the image forming section 11 in the conveyance direction indicated by the arrow in FIG. 1. The winding device 15 winds up the roll sheet R on which an image is formed by the image forming section 11. The roll sheet R wound by the winding device 15 is processed by a post-processing machine (not illustrated). The post-processing machine cuts out a label image or a package image formed on the roll sheet R, for example.

The image forming section 11 includes image forming units 20Y, 20M, 20C, 20K, 20W respectively corresponding to yellow, magenta, cyan, black and white. Here, "Y," "M," "C," "K" and "W" represent yellow, magenta, cyan, black and white, respectively. An image is formed by driving of at least one of the image forming units 20Y, 20M, 20C, 20K, 20W. When all of the image forming units 20Y, 20M, 20C, 20K, 20W are driven, a full-color image is formed. Printing data pieces for yellow, magenta, cyan, black and white are input to the image forming units 20Y, 20M, 20C, 20K, 20W, respectively.

Although the image forming units 20Y, 20M, 20C, 20K, 20W handle toners of different colors, their configurations and functions are the same. Therefore, the image forming unit 20Y for forming yellow images will be described here. Note that, in order to distinguish the members included in the image forming units 20Y, 20M, 20C, 20K, 20W, the respective members are denoted by English letters Y, M, C, K, W following reference numerals. A plurality of members denoted by the same reference numerals are the same members.

The image forming unit 20Y includes a developing device 21Y, a photosensitive drum 22Y serving as an image bearing member, a charging roller 23Y, an exposure device 24Y, a primary transfer roller 26Y, a first bottle container 40Y to which a toner bottle 30Y is attachable and from which the toner bottle 30Y is detachable, and a second bottle container 50Y to which the toner bottle 30Y is attachable and from which the toner bottle 30Y is detachable. The toner bottle 30Y is one example of a toner container.

The developing device 21Y includes a developing roller 25Y. The developing roller 25Y has a built-in magnet roller, and holds a charged toner contained in the developing device 21Y using the effect of a magnetic force.

The photosensitive drum 22Y has a cylindrical shape. Around the photosensitive drum 22Y, the charging roller 23Y, the exposure device 24Y, the developing roller 25Y and the primary transfer roller 26Y are arranged in this order in the rotation direction of the photosensitive drum 22Y.

In the developing device 21Y, a developer including a carrier and a toner is contained. A toner concentration sensor SEY is arranged in the space where the developer of the developing device 21Y is contained. The toner concentration sensor SEY detects a toner concentration of the developer. A toner concentration is the ratio between the toner and the carrier. The toner concentration sensor SEY can use a sensor that measures magnetic permeability. In this case, the CPU 111 (see FIG. 7), described below, calculates a toner concentration based on the magnetic permeability using the relationship between the magnetic permeability and a toner concentration stored in the HDD 115 (see FIG. 7).

The surface of the photosensitive drum 22Y is charged by the charging roller 23Y and then irradiated with a laser beam emitted by the exposure device 24Y. The exposure device 24Y forms an electrostatic latent image by exposing the portion corresponding to an image on the surface of the photosensitive drum 22Y. Thus, the electrostatic latent image is formed on the photosensitive drum 22Y. Subsequently, the developing device 21Y develops the electrostatic latent image formed on the photosensitive drum 22Y with a toner. Specifically, the toner held by the developing roller 25Y is placed on the electrostatic latent image formed on the photosensitive drum 22Y by the effect of an electric field force, so that a toner image is formed on the photosensitive drum 22Y. The toner image formed on the photosensitive drum 22Y is transferred by the primary transfer roller 26Y onto an intermediate transfer belt 29, which is an image bearing member, by the effect of an electric field force.

The intermediate transfer belt 29 is suspended by a driving roller R1 and a driven roller R2 so as not to loosen. When the driving roller 33 is rotated in the clockwise direction in FIG. 1, the intermediate transfer belt 29 is rotated in the clockwise direction in the diagram at a predetermined speed. The driven roller R2 is rotated in the clockwise direction as the intermediate transfer belt 29 is rotated.

Thus, the image forming units 20Y, 20M, 20C, 20K, 20W transfer toner images onto the intermediate transfer belt 29 in this order. Timing for transferring toner images onto the intermediate transfer belt 29 by the respective image forming units 20Y, 20M, 20C, 20K, 20W is adjusted by detection of a reference mark provided on the intermediate transfer belt 29. Thus, the toner images in yellow, magenta, cyan, black and white are superimposed on the intermediate transfer belt 29.

The toner images formed on the intermediate transfer belt 29 are transferred onto the roll sheet R by a secondary transfer roller R3 with the effect of an electric field force. The roll sheet R onto which the toner images have been transferred is conveyed to a pair of fixing rollers R4 to be heated and pressurized. Thus, the toner is fused and fixed to the roll sheet R.

While driving all of the image forming units 20Y, 20M, 20C, 20K, 20W in a case in which forming a full-color image, the image forming apparatus 1 drives one of the image forming units 20Y, 20M, 20C, 20K, 20W in a case in which forming a monochrome image. It is also possible to form an image in combination of two or more of the image forming units 20Y, 20M, 20C, 20K, 20W.

Figure 2:
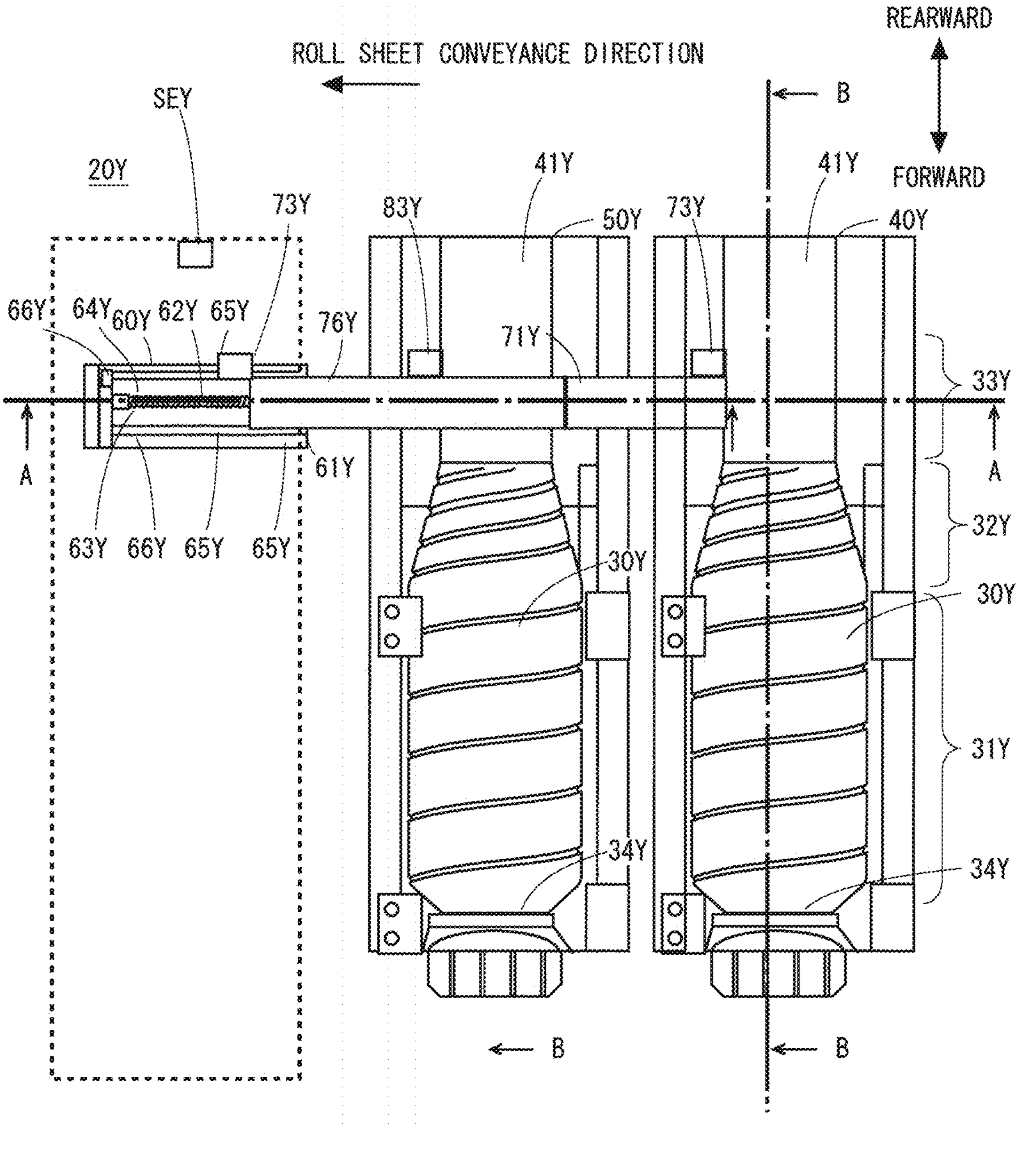
FIG. 2 is a plan view illustrating the inner configuration of an image forming unit.
Figure 3:
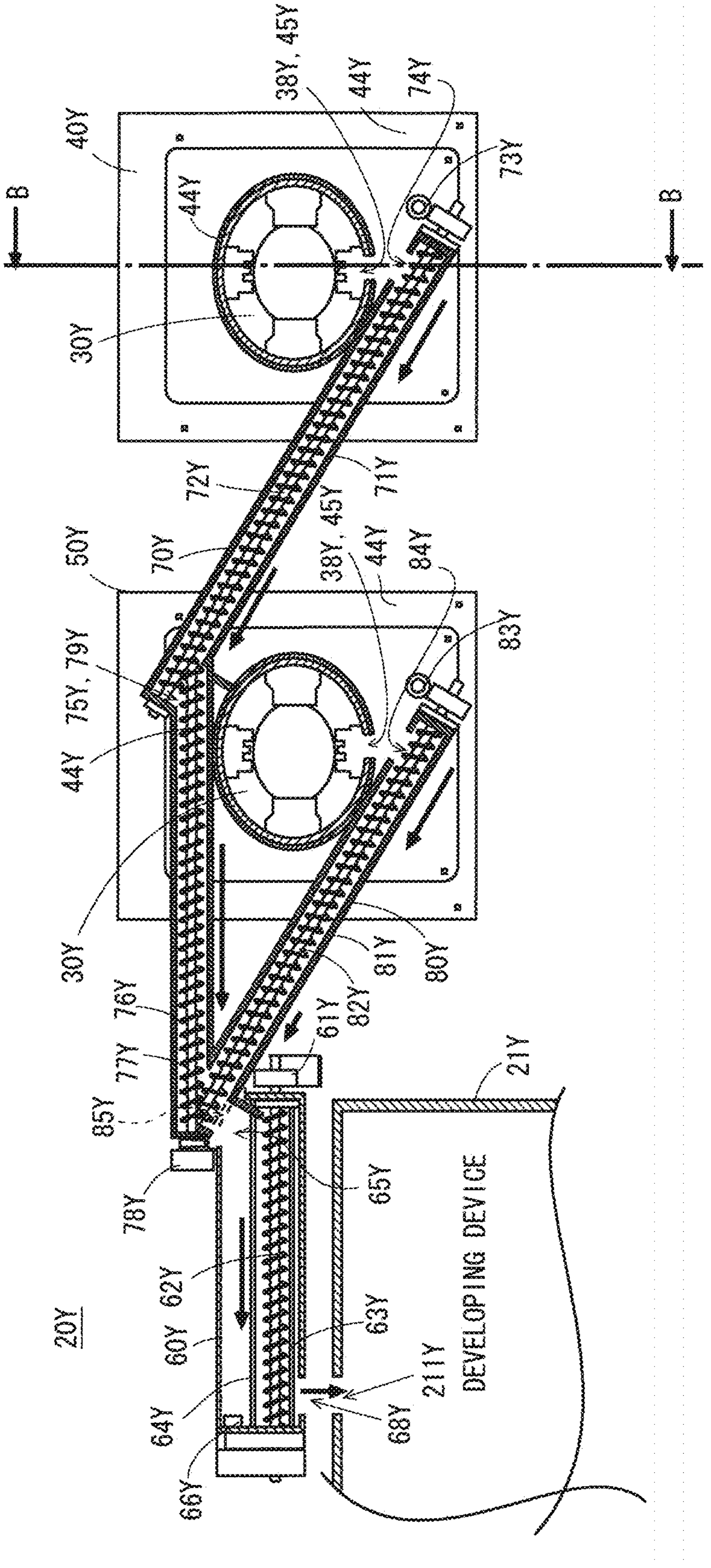
FIG. 3 is a cross sectional view taken along the line A-A of FIG. 2.
Figure 4:
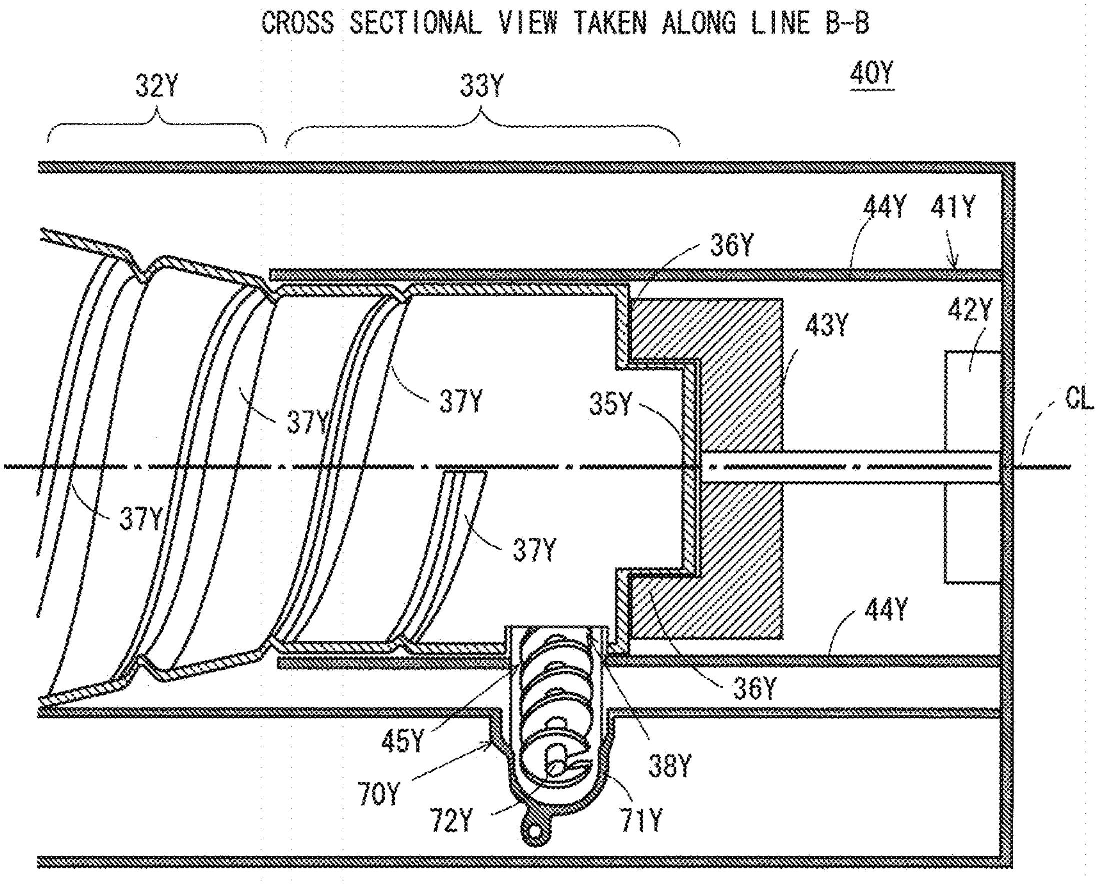
FIG. 4 is a diagram illustrating part of the cross section taken along the line B-B of FIG. 3.

FIG. 2 is a plan view illustrating the inner configuration of an image forming unit. FIG. 3 is a cross sectional view taken along the line A-A of FIG. 2. FIG. 4 is a diagram illustrating part of the cross section taken along the line B-B of FIG. 3. In FIG. 2 to FIG. 4, in order to describe the inner configuration of the image forming unit 20Y, some members are not illustrated. Hereinafter, for the sake of description, the direction orthogonal to the conveyance direction of the roll sheet R is referred to as a forward-and-rearward direction. Further, the direction directed from the rear surface toward the front surface is referred to as a forward direction, and the direction directed from the front surface toward the rear surface is referred to as a rearward direction.

With reference to FIG. 2 to FIG. 4, in the image forming unit 20Y, the first bottle container 40Y, the second bottle container 50Y and a toner hopper 60Y are arranged on the path on which a toner is conveyed. The direction in which the toner is conveyed is the same as the direction in which the roll sheet R is conveyed. The first bottle container 40Y is arranged most upstream, the second bottle container 50Y is arranged at a position farther downstream than the first bottle container 40Y, and the toner hopper 60Y is arranged at a position farther downstream than the second bottle container 50Y. The toner hopper 60Y is arranged immediately upstream of the developing device 21Y.

The first bottle container 40Y is connected to the toner hopper 60Y by a first conveyance path 70Y. The second bottle container 50Y is connected to the toner hopper 60Y by a second conveyance path 80Y. The toner hopper 60Y is arranged above the developing device 21Y.

The toner bottle 30Y includes a body portion 31Y, a tapered portion 32Y and a gripped portion 33Y. The body portion 31Y extends in a substantially cylindrical shape and has a bottom portion 34Y at one end. The tapered portion 32Y extends such that its diameter gradually is decreased from the other end of the body portion 31Y toward the gripped portion 33Y. The gripped portion 33Y extends in a cylindrical shape from the tip of the tapered portion 32Y and has a top portion 35Y at one end. A fitting groove 36Y is formed in the top portion 35Y. An opening 38Y that outwardly opens is formed in the portion of the gripped portion 33Y extending in a cylindrical shape.

The axial center of the toner bottle 30Y is referred to as a center line CL, and the direction orthogonal to the center line CL is referred to as a radial direction. In the present example, the toner bottle 30Y is attached to one of the first bottle container 40Y and the second bottle container 50Y with the center line CL being horizontal. The toner bottle 30Y has an inner peripheral surface extending from the bottom portion 34Y toward the top portion 35Y about the center line CL. The toner bottle 30Y has a convex portion 37Y that protrudes inwardly from the inner peripheral surface and extends spirally about the center line CL from the bottom portion 34Y to the opening 38Y.

The first bottle container 40Y and the second bottle container 50Y can respectively contain the same type of the toner bottles 30Y. The toner bottle 30Y that can be contained in the first bottle container 40Y and the toner bottle 30Y that can be contained in the second bottle container 50Y contain toners of the same color.

A first toner volume that can be contained in the toner bottle 30Y contained in the first bottle container 40Y and a second toner volume that can be contained in the toner bottle 30Y contained in the second bottle container 50Y are the same in the present embodiment. Note that the first toner volume and the second toner volume may be different from each other. A toner volume is represented by a weight of toner.

Further, the sum of the first toner volume and the second toner volume is the toner volume that enables continuous printing on the roll sheet R equal to or larger than 1000 m at a predetermined printing rate. Further, it is preferable that the sum of the first toner volume and the second toner volume is the toner volume that enables continuous printing on a sheet equal to or larger than 3000 m. A printing rate is the ratio of an area in which toner images are formed per unit area. In a case in which a plurality of types of roll sheets R having different widths are present, the first toner volume and the second toner volume are determined based on a roll sheet R having the largest width. Because a toner consumption amount per unit area can be calculated based on a printing rate, the first toner volume and the second toner volume are obtained based on an area determined based on the width of a roll sheet R and the length of the roll sheet R, and a toner consumption amount per unit area. The predetermined printing rate is preferably 15%. Therefore, it is possible to form images on a roll sheet R having a sufficient length using the toner bottle 30Y that can be contained in the first bottle container 40Y and the toner bottle 30Y that can be contained in the second bottle container 50Y.

The first bottle container 40Y and the second bottle container 50Y basically have the same structure. Here, the first bottle container 40Y is described as an example.

The first bottle container 40Y extends in one direction and in a rectangular tube shape and is fixed to the housing of the image forming section 11 with the longitudinal direction being horizontal and being parallel to the forward-and-rearward direction. The first bottle container 40Y has an inner space that can contain the toner bottle 30Y. The first bottle container 40Y has an opening that outwardly opens the inner space in the front side surface. The first bottle container 40Y includes a bottle rotation mechanism 41Y.

The bottle rotation mechanism 41Y includes a bottle motor 42Y, a gripping member 43Y and a guide member 44Y. The guide member 44Y has one end being fixed to the rear sidewall of the first bottle container 40Y and extends horizontally in a cylindrical shape from the sidewall in the inner space of the first bottle container 40Y. At the other end, the guide member 44Y has an opening that outwardly opens the inner space of the guide member 44Y. Further, the guide member 44Y has an opening 45Y that downwardly opens the inner space of the guide member 44Y.

The bottle motor 42Y is fixed to the rear sidewall of the first bottle container 40Y in the inner space of the guide member 44Y. The gripping member 43Y is connected to the tip of the rotation shaft of the bottle motor 42Y. A fitting claw is formed at the front surface of the gripping member 43Y.

The toner bottle 30Y is attachable to and detachable from the first bottle container 40Y. While being horizontal, the toner bottle 30Y is inserted from the front opening of the first bottle container 40Y into the inner space of the first bottle container 40Y. The top portion 35Y of the toner bottle 30Y rearwardly advances into the inner space of the first bottle container 40Y. When the toner bottle 30Y further advances, the top portion 35Y advances into the inner space of the guide member 44Y, and the fitting claw formed at the gripping member 43Y is fitted to the fitting groove 36Y formed in the top portion 35Y of the toner bottle 30Y.

With the fitting claw formed at the gripping member 43Y being fitted to the fitting groove 36Y, a rotational force of the bottle motor 42Y is transmitted to the toner bottle 30Y. Therefore, the toner bottle 30Y is rotated by the bottle motor 42Y. The inner diameter of the guide member 44Y is set equal to or slightly larger than the outer diameter of the gripped portion 33Y of the toner bottle 30Y. Thus, because rotating while sliding on the inner peripheral surface of the guide member 44Y, the toner bottle 30Y can be smoothly rotated about its center line CL.

The positions of the opening 45Y formed in the guide member 44Y and the opening 38Y formed in the gripped portion 33Y of the toner bottle 30Y are defined such that, with the fitting claw formed at the gripping member 43Y being fitted to the fitting groove 36Y, the distances from the rear sidewall of the first bottle container 40Y to the respective openings 45Y, 38Y are the same. Therefore, in a period during which the toner bottle 30Y is rotated once, there is a period of time during which the opening 38Y and the opening 45Y overlap with each other in plan view.

One end of the first conveyance path 70Y is located inside of the first bottle container 40Y and below the toner bottle 30Y, and the other end of the first conveyance path 70Y is located above the toner hopper 60Y. The first conveyance path 70Y has a first cylindrical member 71Y and a second cylindrical member 76Y.

The first cylindrical member 71Y has a shape extending in one direction and in a cylindrical shape, one of the both ends of the first cylindrical member 71 is arranged below the guide member 44Y, and the other end of the first cylindrical member 71Y is connected to one end of the second cylindrical member 76Y. In the portion in which the first cylindrical member 71Y and the second cylindrical member 76Y are connected to each other, the first cylindrical member 71Y is located higher than the second cylindrical member 76Y.

The first cylindrical member 71Y contains a first conveyance screw 72Y extending in one direction. The first conveyance screw 72Y includes a rotation shaft extending in one direction and a blade which is a convex portion spirally extending from one end to the other end about the axial center of the rotation shaft. The first conveyance screw 72Y is rotatably contained in the inner space of the first cylindrical member 71Y with its axial center overlapping with the axial center of the first cylindrical member 71Y. The outer diameter of the first conveyance screw 72Y is equal to or slightly smaller than the inner diameter of the first cylindrical member 71Y. The first conveyance screw 72Y is connected to a first conveyance motor 73Y via gears, and a rotational force of the first conveyance motor 73Y is transmitted to the first conveyance screw 72Y. The first conveyance motor 73Y is a DC motor. Therefore, it is possible to reduce the cost of the first conveyance motor 73Y.

In the first cylindrical member 71Y, at a lower position opposite to the opening 45Y formed in the guide member 44Y of the first bottle container 40Y, a first receiving port 74Y is formed as an opening that upwardly opens the inner space. Therefore, the opening 45Y and the first receiving port 74Y overlap with each other in plan view. A clearance is formed between the opening 45Y formed in the guide member 44Y and the first receiving port 74Y formed in the first cylindrical member 71Y. Further, in the first cylindrical member 71Y, a first supply port 75Y, which is an opening that downwardly opens the inner space, is formed at the end portion opposite to the end portion in which the first receiving port 74Y is formed. The first conveyance screw 72Y extends from a position below the first receiving port 74Y to a position above the first supply port 75Y.

The second cylindrical member 76Y has a shape extending in one direction and in a cylindrical shape, has one end connected to the other end of the first cylindrical member 71Y, and has the other end connected to a merging portion 85Y. The second cylindrical member 76Y contains a second conveyance screw 77Y extending in one direction. The second conveyance screw 77Y includes a rotation shaft extending in one direction and a blade which is a convex portion spirally extending from one end to the other end about the axial center of the rotation shaft. The second conveyance screw 77Y is rotatably contained in the inner space of the second cylindrical member 76Y with its axial center overlapping with the axial center of the second cylindrical member 76Y. The outer diameter of the second conveyance screw 77Y is equal to or slightly smaller than the inner diameter of the second cylindrical member 76Y. The second conveyance screw 77Y is connected to a second conveyance motor 78Y via gears, and a rotational force of the second conveyance motor 78Y is transmitted to the second conveyance screw 77Y.

The second conveyance motor 78Y is a DC motor. Therefore, it is possible to reduce the cost of the second conveyance motor 78Y.

In the second cylindrical member 76Y, at a position opposite to the first supply port 75Y formed in the first cylindrical member 71Y, a second receiving port 79Y is formed as an opening that upwardly opens the inner space. Therefore, the first supply port 75Y and the second receiving port 79Y overlap with each other in plan view. Further, in the second cylindrical member 76Y, an opening that opens the inner space to the merging portion 85 below the inner space is formed in the end portion opposite to the end portion in which the second receiving port 79Y is formed. Therefore, the inner space of the second cylindrical member 76Y and the merging portion 85Y communicate with each other through the opening formed in the end portion opposite to the end portion in which the second receiving port 79Y is formed. The second conveyance screw 77Y extends from a position below the second receiving port 79Y to a position above the merging portion 85Y. Further, the first conveyance screw 72Y is located farther upwardly than the second conveyance screw 77Y. Therefore, the first conveyance screw 72Y and the second conveyance screw 77Y do not interfere with each other.

One end of the second conveyance path 80Y is located in the second bottle container 50Y and below the toner bottle 30Y, and the other end of the second conveyance path 80Y is located above the toner hopper 60Y. The second conveyance path 80Y includes a third cylindrical member 81Y.

The third cylindrical member 81Y has a shape extending in one direction and in a cylindrical shape, one of the both ends of the third cylindrical member 81Y is arranged below the guide member 44Y of the second bottle container 50Y, and the other end of the third cylindrical member 81Y is connected to the merging portion 85Y. In the portion in which the third cylindrical member 81Y and the merging portion 85Y are connected to each other, the third cylindrical member 81Y is located higher than the merging portion 85Y.

The third cylindrical member 81Y contains a third conveyance screw 82Y extending in one direction. The third conveyance screw 82Y includes a rotation shaft and a spiral blade centered at the rotation shaft. The rotation shaft of the third conveyance screw 82Y is connected to a third conveyance motor 83Y. A rotational force of the third conveyance motor 83Y is transmitted to the third conveyance screw 82Y, and the third conveyance screw 82Y is rotated in the third cylindrical member 81Y. The third conveyance motor 83Y is a DC motor. Therefore, it is possible to reduce the cost of the third conveyance motor 83Y.

In the third cylindrical member 81Y, at a lower position opposite to the opening 45Y formed in the guide member 44Y of the second bottle container 50Y, a third receiving port 84Y is formed as an opening that upwardly opens the inner space. Therefore, the opening 45Y and the third receiving port 84Y overlap with each other in plan view. A clearance is formed between the opening 45Y formed in the guide member 44Y and the third receiving port 84Y formed in the third cylindrical member 81Y. Further, in the third cylindrical member 81Y, an opening that opens the inner space to the merging portion 85Y is formed in the end portion opposite to the receiving end in which the third receiving port 84Y is formed. Therefore, the inner space of the third cylindrical member 81Y and the merging portion 85Y communicate with each other through the opening formed in the end portion opposite to the end portion in which the third receiving port 84Y is formed. The third conveyance screw 82Y extends from a position below the third receiving port 84Y to a position above the merging portion 85Y.

The second conveyance screw 77Y is located farther upwardly than the third conveyance screw 82Y. Therefore, the second conveyance screw 77Y and the third conveyance screw 82Y do not interfere with each other.

Figure 5:
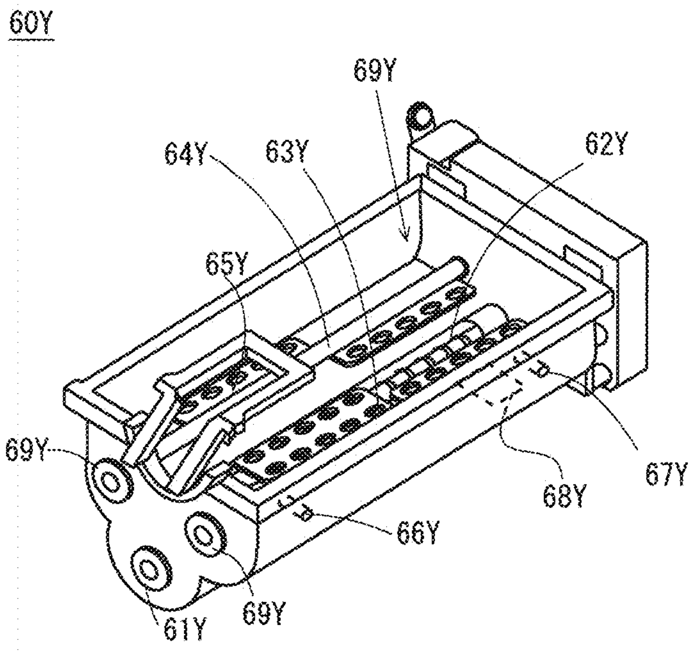
FIG. 5 is a perspective view of a toner hopper.
Figure 6:
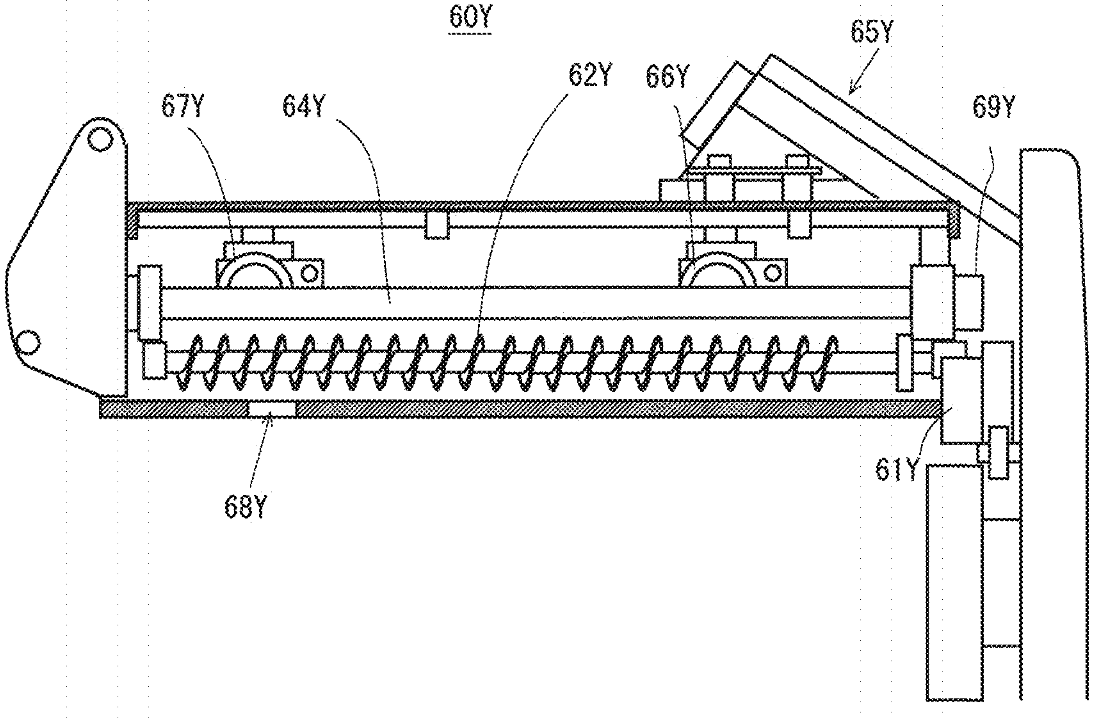
FIG. 6 is a cross sectional view of the toner hopper.

The toner hopper 60Y is arranged below the merging portion 85Y. FIG. 5 is a perspective view of a toner hopper. FIG. 6 is a cross sectional view of the toner hopper. In FIG. 5 and FIG. 6, in order to describe the inner configuration of the toner hopper 60Y, some members are not illustrated.

With reference to FIG. 5 and FIG. 6, the toner hopper 60Y has a rectangular shape that is elongated in one direction and has a housing having an inner space that contains a toner. In the housing, an opening 65Y that upwardly opens the inner space is formed. The inner space communicates with the merging portion 85Y through the opening 65Y. In the present embodiment, the toner hopper 60Y is arranged such that its longitudinal direction is parallel to the conveyance direction of a roll sheet R. The toner hopper 60Y includes a supply motor 61Y, a supply screw 62Y, two stirring members 63Y, 64Y and two stirring motors 69Y. The supply screw 62Y includes a rotation shaft that extends in parallel with the longitudinal direction of the inner space, and a blade that is a convex portion spirally extending from one end to the other end about the axial center of the rotation shaft. The supply screw 62Y is arranged substantially at the center in the forward-and-rearward direction in the bottom portion of the inner space.

Each of the two stirring members 63Y, 64Y includes a rotation shaft extending in parallel with the longitudinal direction of the inner space and a plurality of stirring plates. The plurality of stirring plates are arranged in a dispersed manner in the direction in which the rotation shaft extends, and extend in a plate shape and orthogonally from the rotation shaft. A plurality of holes are formed in the plurality of stirring plates.

Each of the two stirring members 63Y, 64Y is arranged farther upwardly than the supply screw 62Y at a position at which its rotation shaft is parallel to the rotation shaft of the supply screw 62Y. The two stirring members 63Y, 64Y are arranged to sandwich the supply screw 62Y in plan view.

In the housing of the toner hopper 60Y, the inner surface of the bottom portion has a shape in which parts of the side surfaces of three columns are arranged in parallel to one another. In the housing of the toner hopper 60Y, the inner surface of the bottom portion is formed of part of a circle centered at the rotation shaft of the supply screw 62Y and parts of circles centered at the rotation shafts of the respective two stirring members 63Y, 64Y, in the cross section in the plane orthogonal to the conveyance direction of a roll sheet R.

In the bottom portion of the housing of the toner hopper 60Y, a discharge port 68Y that downwardly opens the inner space is formed in the end portion opposite to the opening 65Y in the conveyance direction of a roll sheet R. The discharge port 68Y overlaps with part of the supply screw 62Y in plan view.

As illustrated in FIG. 3, the developing device 21Y has a receiving port 211Y, which is an opening outwardly opening the inner space. The discharge port 68Y overlaps with the receiving port 211Y formed in the developing device 21Y in plan view. Below the discharge port 68Y, a gap is formed between the discharge port 68Y and the receiving port 211Y.

The supply screw 62Y is connected to the supply motor 61Y via gears, and a rotational force of the supply motor 61Y is transmitted to the supply screw 62Y. The supply motor 61Y is a stepping motor. The two stirring members 63Y, 64Y are respectively connected to the stirring motor 69Y via gears, and a rotating force of the stirring motor 69Y is transmitted to the stirring members 63Y, 64Y. The stirring motor 69Y is a DC motor. Therefore, it is possible to reduce the cost of the stirring motor 69Y. The two stirring members 63Y, 64Y are rotated in directions that are different from each other.

The toner hopper 60Y has a first toner sensor 66Y and a second toner sensor 67Y in the inner space. The first toner sensor 66Y and the second toner sensor 67Y are fixed to the side surface of the housing at a predetermined height position from the bottom portion of the housing of the toner hopper 60Y. The first toner sensor 66Y and the second toner sensor 67Y are arranged side by side at a predetermined interval in the conveyance direction of a roll sheet R. The distance from the first toner sensor 66Y to the opening 65Y is shorter than the distance from the second toner sensor 67Y to the opening 65Y. The distance from the second toner sensor 67Y to the discharge port 68Y is shorter than the distance from the first toner sensor 66Y to the discharge port 68Y.

Each of the first toner sensor 66Y and the second toner sensor 67Y outputs an ON signal to the CPU 111 (see FIG. 7) when detecting a toner, and outputs an OFF signal to the CPU 111 when not detecting a toner. The first toner sensor 66Y and the second toner sensor 67Y are piezoelectric elements, for example.

With reference to FIG. 4, when the toner bottle 30Y is rotated by the bottle rotation mechanism 41Y in the first bottle container 40Y, a toner in the toner bottle 30Y is conveyed rearwardly by the convex portion 37Y formed on the inner peripheral surface of the toner bottle 30Y. Part of the toner that has reached the gripped portion 33Y is outwardly discharged from the opening 38Y formed in the gripped portion 33Y. The toner discharged from the opening 38Y falls into the inner space of the first cylindrical member 71Y through the opening 45Y in the guide member 44Y, the clearance, and the first receiving port 74Y formed in the first cylindrical member 71Y.

The first conveyance path 70Y conveys the toner supplied from the toner bottle 30Y attached to the first bottle container 40Y to the toner hopper 60Y.

With reference to FIG. 3, the first conveyance screw 72Y extends from a position below the first receiving port 74Y to a position above the first supply port 75Y. When the first conveyance screw 72Y is rotated by the first conveyance motor 73Y, the toner received from the first receiving port 74Y formed in the first cylindrical member 71Y is conveyed in the inner space of the first cylindrical member 71Y in the direction from a position below the first receiving port 74Y of the first cylindrical member 71Y toward a position above the first supply port 75Y and falls from the first supply port 75Y.

The second conveyance screw 77Y extends from a position below the second receiving port 79Y to a position above the merging portion 85Y. When the second conveyance screw 77Y is rotated by the second conveyance motor 78Y, the toner received from the second receiving port 79Y formed in the second cylindrical member 76Y is conveyed in the inner space of the second cylindrical member 76Y in the direction from a position below the second receiving port 79Y of the second cylindrical member 76Y toward a position above the merging portion 85Y, and falls into the merging portion 85Y.

When the toner bottle 30Y is rotated by the bottle rotation mechanism 41Y in the second bottle container 50Y, a toner in the toner bottle 30Y is conveyed rearwardly by the convex portion 37Y formed on the inner peripheral surface of the toner bottle 30Y. Part of the toner that has reached the gripped portion 33Y is outwardly discharged from the opening 38Y formed in the gripped portion 33Y. The toner discharged from the opening 38Y falls into the inner space of the third cylindrical member 81Y through the opening 45Y formed in the guide member 44Y, the clearance, and the third receiving port 84Y formed in the third cylindrical member 81Y.

The second conveyance path 80Y conveys the toner supplied from the toner bottle 30Y attached to the second bottle container 50Y to the toner hopper 60Y. The third conveyance screw 82Y extends from a position below the third receiving port 84Y to a position above the merging portion 85Y. When the third conveyance screw 82Y is rotated by the third conveyance motor 83Y, the toner received from the third receiving port 84Y formed in the third cylindrical member 81Y is conveyed in the inner space of the third cylindrical member 81Y in the direction from a position below the third receiving port 84Y of the third cylindrical member 81Y toward a position above the merging portion 85Y, and falls into the merging portion 85Y.

The toner that falls from the second cylindrical member 76Y or the third cylindrical member 81Y falls from the opening 65Y of the toner hopper 60Y into the inner space. The toner hopper 60Y contains the toner in the inner space of the housing. When the two stirring members 63Y, 64Y are rotated by the stirring motor 69Y, the toner contained in the inner space of the toner hopper 60Y is stirred by the two stirring members 63Y, 64Y. When the supply screw 62Y is rotated by the supply motor 61Y, a toner, in the vicinity of the bottom portion of the inner space out of the toner contained in the inner space, is conveyed by the supply screw 62Y in the conveyance direction of a roll sheet R and falls from the discharge port 68Y into the developing device 21Y.

The toner discharged from the discharge port 68Y enters the inner space of the developing device 21Y from the receiving port 211Y through a gap. The gap between the discharge port 68Y and the receiving port 211Y forms a toner conveyance path.

The supply motor 61Y is a stepping motor. Therefore, because a rotation amount of the supply screw 62Y can be adjusted by control of a rotation amount of the supply motor 61Y, it is possible to adjust an amount of the toner that falls into the developing device 21Y per unit time.

Figure 7:
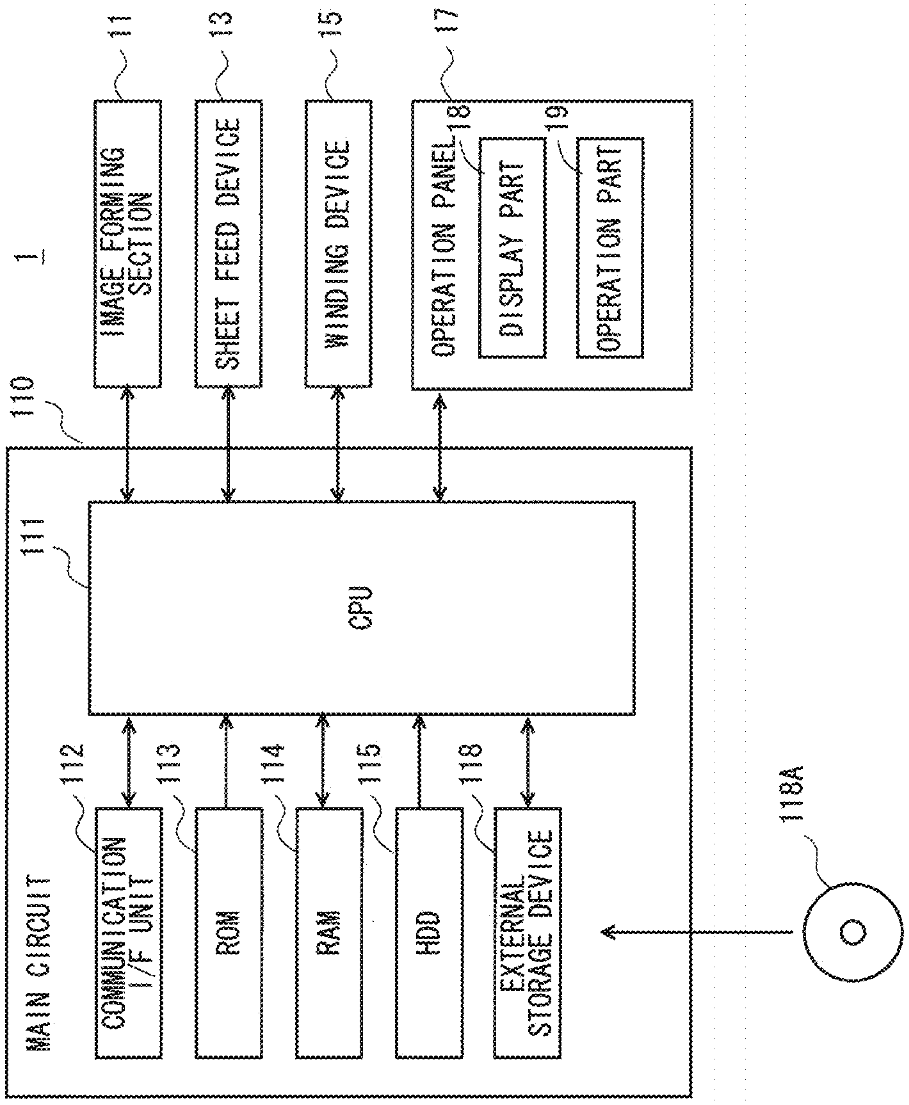
FIG. 7 is a block diagram illustrating the outline of the hardware configuration of the image forming apparatus in the present embodiment.

FIG. 7 is a block diagram illustrating the overview of the hardware configuration of the image forming apparatus in the present embodiment. With reference to FIG. 7, the image forming apparatus 1 includes a main circuit 110 and an operation panel 17 serving as a user interface. The main circuit 110 and the operation panel 17 are provided in the image forming section 11.

The main circuit 110 includes a Central Processing Unit (CPU) 111 for controlling the image forming apparatus 1 as a whole, a communication interface (I/F) section 112, a Read Only Memory (ROM) 113, a Random Access Memory (RAM) 114, a Hard Disc Drive (HDD) 115 that is used as a mass storage device and an external storage device 118. The CPU 111 is connected to the image forming section 11, the sheet feed device 13, the winding device 15 and the operation panel 17, and controls the image forming apparatus 1 as a whole.

The ROM 113 stores a program to be executed by the CPU 111 or data required for execution of the program. The RAM 114 is used as a work area when the CPU 111 executes a program. Further, the RAM 114 temporarily stores image data successively transmitted from a document reading section 130.

The operation panel 17 is provided in an upper portion of the housing of the image forming section 11. The operation panel 17 includes a display part 18 and an operation part 19. The display part 18 is a Liquid Crystal Display (LCD), for example, and displays an instruction menu for a user, information about acquired image data, etc. As long as displaying images, an organic Electroluminescence (EL) display, for example, can be used instead of the LCD.

The operation part 19 includes a touch screen and hard keys. The touch screen is arranged in a superimposed manner on the display surface of the display part 18, and detects a position designated by the user in the display surface of the display part 18. The hard keys are contact switches, for example.

A communication I/F section 112 is an interface for connecting the image forming apparatus 1 to a network. The communication I/F section 112 communicates with another computer or a data processing apparatus connected to the network using a communication protocol such as Transmission Control Protocol (TCP) or File Transfer Protocol (FTP). The network to which the communication I/F section 112 is connected is a Local Area Network (LAN), and the connection form may be wired or wireless. Further, the network is not limited to a LAN and may be a Wide Area Network (WAN), a Public Switched Telephone Network (PSTN), the Internet or the like.

The external storage device 118 is controlled by the CPU 111 and mounted with a Compact Disk Read Only Memory (CD-ROM) 118A or a semiconductor memory. While the CPU 111 executes a program stored in the ROM 113 by way of example in the present embodiment, the CPU 111 may control the external storage device 118, read a program to be executed by the CPU 111 from the CD-ROM 118A and store the read program in the RAM 114 for execution.

It is noted that a recording medium for storing a program to be executed by the CPU 111 is not limited to the CD-ROM 118A. It may be a flexible disc, a cassette tape, an optical disc (Magnetic Optical Disc (MO)/Mini Disc (MD)/Digital Versatile Disc (DVD)), an IC card, an optical card, and a semiconductor memory such as a mask ROM and an Erasable Programmable ROM (EPROM). Further, the CPU 111 may download a program from a computer connected to a network and store the program in the HDD 115, or the computer connected to the network may write a program in the HDD 115. Then, a program stored in the HDD 115 may be loaded into the RAM 114 to be executed by the CPU 111. The program referred to here includes not only a program directly executable by the CPU 111 but also a source program, a compressed program, an encrypted program and the like.

Figure 8:
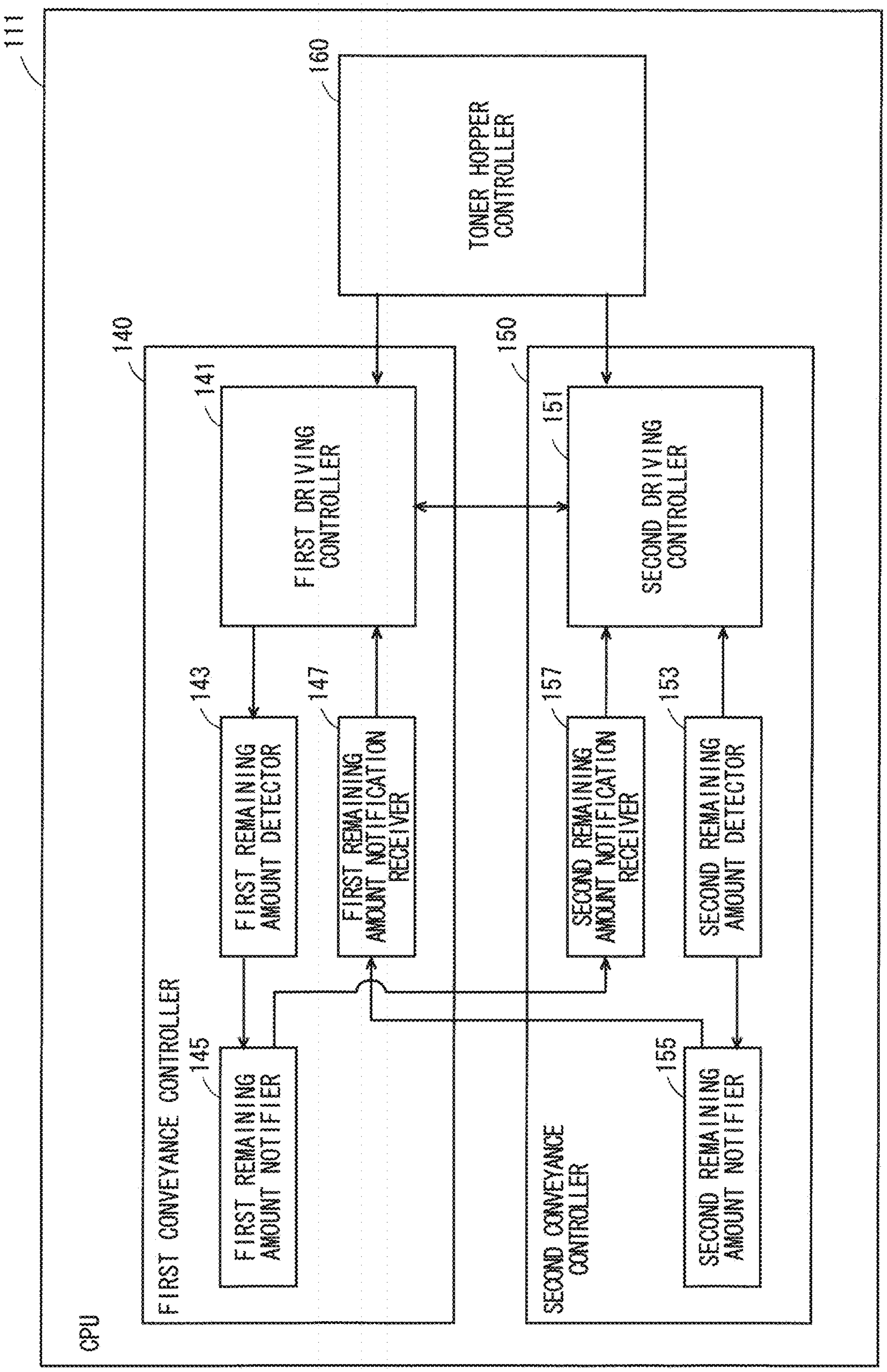
FIG. 8 is a block diagram illustrating one example of the functions of a CPU included in the image forming apparatus in the present embodiment.

FIG. 8 is a block diagram illustrating one example of the functions of a CPU included in the image forming apparatus in the present embodiment. The functions illustrated in FIG. 8 are implemented by the CPU 111 in a case in which the CPU 111 included in the image forming apparatus 100 executes a device adjustment program stored in the ROM 113, the HDD 115 or the CD-ROM 118A. With reference to FIG. 4, the CPU 111 includes a first conveyance controller 140, a second conveyance controller 150 and a toner hopper controller 160.

The toner hopper controller 160 controls the toner hopper 60Y. The toner hopper controller 160 detects a toner concentration based on an output value of the toner concentration sensor SEY included in the developing device 21Y. In response to the toner concentration falling below a threshold value TH, the toner hopper controller 160 drives the supply motor 61Y and the stirring motor 69Y included in the toner hopper 60Y. In response to the toner concentration becoming equal to or larger than the threshold value TH, the toner hopper controller 160 stops the supply motor 61Y and the stirring motor 69Y. In a period during which the supply motor 61Y is driven, the supply screw 62Y is rotated. Therefore, a toner is supplied from the toner hopper 60Y to the developing device 21Y. Because the supply motor 61Y is not rotated in a period during which the toner concentration is equal to or larger than the threshold value TH, a toner is not supplied to the developing device 21Y. Therefore, the toner concentration of a developer contained in the developing device 21Y is maintained equal to or smaller than the threshold value TH.

Here, the state of a toner contained in the toner hopper 60Y will be described. With reference to FIG. 6, a toner is conveyed from a position below the opening 65Y toward a position above the discharge port 68Y by rotation of the supply screw 62Y. The first toner sensor 66Y is arranged at a position farther upstream than the second toner sensor 67Y. The state of a toner contained in the toner hopper 60Y with a toner not received from the opening 65Y will be described. Here, a first state in which a toner is present in the vicinity of each of the first toner sensor 66Y and the second toner sensor 67Y is defined. The supply screw 62Y is rotated in the first state, so that a toner present in the vicinity of the first toner sensor 66Y is conveyed toward the discharge port 68Y. Therefore, a toner contained in the toner hopper 60Y is put in a second state in which a toner is present in the vicinity of the second toner sensor 67Y but not present in the vicinity of the first toner sensor 66Y. When the supply screw 62Y is rotated without reception of the toner from the opening 65Y in the second state, a toner present in the vicinity of the second toner sensor 67Y falls from the discharge port 68Y. Therefore, a toner contained in the toner hopper 60Y is put in a third state in which a toner is not present in the vicinity of either of the first toner sensor 66Y or the second toner sensor 67Y. On the other hand, when a toner is received from the opening 65Y in the second state, a toner contained in the toner hopper 60Y is put in the first state.

The toner hopper controller 160 detects the state of a toner contained in the toner hopper 60Y based on respective output values of the first toner sensor 66Y and the second toner sensor 67Y. Specifically, the toner hopper controller 160 detects the first state when respective output values of the first toner sensor 66Y and the second toner sensor 67Y are ON signals, detects the second state when an output value of the first toner sensor 66Y is an OFF signal and an output value of the second toner sensor 67Y is an ON signal, and detects the third state when the respective output values of the first toner sensor 66Y and the second toner sensor 67Y are OFF signals. The toner hopper controller 160 outputs the state of a toner contained in the toner hopper 60Y to the first conveyance controller 140 and the second conveyance controller 150.

The first conveyance controller 140 controls the first bottle container 40Y and the first conveyance path 70Y. The second conveyance controller 150 controls the second bottle container 50Y and the second conveyance path 80Y. The first conveyance controller 140 and the second conveyance controller 150 perform control such that a toner is supplied from one of the toner bottles 30Y respectively attached to the first bottle container 40Y and the second bottle container 50Y to the toner hopper 60Y, and perform control such that, when the remaining amount of one toner bottle 30Y becomes equal to or smaller than a predetermined amount, a toner is supplied from the other toner bottle 30Y to the toner hopper 60Y. The predetermined amount is larger than 0 and is stored in the HDD 115 as a value that is defined in advance.

The first conveyance controller 140 includes a first driving controller 141, a first remaining amount detector 143, a first remaining amount notifier 145 and a first remaining amount notification receiver 147. While controlling subjects different from those to be controlled by the first conveyance controller 140, the second conveyance controller 150 has similar functions to those of the first conveyance controller 140. The second conveyance controller 150 includes a second driving controller 151, a second remaining amount detector 153, a second remaining amount notifier 155 and a second remaining amount notification receiver 157. The second driving controller 151 corresponds to the first driving controller 141, the second remaining amount detector 153 corresponds to the first remaining amount detector 143, the second remaining amount notifier 155 corresponds to the first remaining amount notifier 145, and the second remaining amount notification receiver 157 corresponds to the first remaining amount notification receiver 147.

In a period during which the state of a toner contained in the toner hopper 60Y, which is received from the toner hopper controller 160, is the second state, the first driving controller 141 supplies a normal toner conveyance amount, which is a toner conveyance amount being defined in advance, of a toner to the toner hopper 60Y. A toner conveyance amount is an amount of a toner to be conveyed per unit time. Specifically, the first driving controller 141 rotates the bottle motor 42Y of the first bottle container 40Y, the first conveyance motor 73Y and the second conveyance motor 78Y at the rotation speeds respectively corresponding to the normal toner conveyance amount.

In a period during which the bottle motor 42Y, the first conveyance motor 73Y and the second conveyance motor 78Y are driven, the toner bottle 30Y, the first conveyance screw 72Y and the second conveyance screw 77Y are rotated. Therefore, the normal toner conveyance amount of a toner contained in the toner bottle 30Y attached to the first bottle container 40Y is supplied from the toner bottle 30Y to the toner hopper 60Y.

When the state of the toner contained in the toner hopper 60Y received from the toner hopper controller 160 is switched from the second state to the first state, the first driving controller 141 stops the bottle motor 42Y of the first bottle container 40Y, the first conveyance motor 73Y and the second conveyance motor 78Y. In a period during which the state of the toner contained in the toner hopper 60Y is the first state, the toner bottle 30Y, the first conveyance screw 72Y and the second conveyance screw 77Y are not rotated. Therefore, the toner contained in the toner bottle 30Y attached to the first bottle container 40Y is not supplied from the toner bottle 30Y to the toner hopper 60Y.

The first remaining amount detector 143 detects a remaining amount of the toner contained in the toner bottle 30Y attached to the first bottle container 40Y. The first remaining amount detector 143 acquires a cumulative number of rotations of the bottle motor 42Y from the first driving controller 141 and calculates a cumulative number of rotations of the toner bottle 30Y. A consumption amount of the toner contained in the toner bottle 30Y is proportional to a cumulative number of rotations of the toner bottle 30Y. The first remaining amount detector 143 detects a consumption amount of the toner based on the cumulative number of rotations of the toner bottle 30Y, and detects a remaining amount based on the containing volume of the toner bottle 30Y and the consumption amount. The containing volume of the toner bottle 30Y indicates an amount of a toner contained in the toner bottle 30Y when the toner bottle 30Y is filled up with a toner before use, and is stored in advance in the HDD 115. The first remaining amount detector 143 outputs the toner remaining amount of the toner bottle 30Y attached to the first bottle container 40Y to the first remaining amount notifier 145.

When the toner remaining amount received from the first remaining amount detector 143 becomes equal to or smaller than a lower limit value being defined in advance, the first remaining amount notifier 145 notifies the second remaining amount notification receiver 157 included in the second conveyance controller 150 of the toner remaining amount of the toner bottle 30Y attached to the first bottle container 40Y.

The second remaining amount notification receiver 157 outputs a driving instruction to the second driving controller 151 in response to receiving a notification of the toner remaining amount of the toner bottle 30Y attached to the first bottle container 40Y from the first remaining amount notifier 145.

In response to receiving the driving instruction from the second remaining amount notification receiver 157, the second driving controller 151 supplies the toner to the toner hopper 60Y in a period during which the state of the toner contained in the toner hopper 60Y received from the toner hopper controller 160 is the second state. Specifically, the second driving controller 151 drives the bottle motor 42Y of the second bottle container 50Y and the third conveyance motor 83Y. In a period during which the bottle motor 42Y and the third conveyance motor 83Y are driven, the toner bottle 30Y and the third conveyance screw 82Y are rotated. Therefore, the toner contained in the toner bottle 30Y attached to the second bottle container 50Y is supplied from the toner bottle 30Y to the toner hopper 60Y.

When the driving instruction is received from the second remaining amount notification receiver 157, the second driving controller 151 starts to supply an initial toner conveyance amount of toner to the toner hopper 60Y, and the toner conveyance amount is gradually increased with an elapse of time until reaching the normal toner conveyance amount. The initial toner conveyance amount is a toner conveyance amount that is defined in advance as a toner conveyance amount for the time when the first driving controller 141 and the second driving controller 151 start supplying a toner. The initial toner conveyance amount is a value smaller than the normal toner conveyance amount and is stored in advance in the HDD 115.

The second driving controller 151 rotates the bottle motor 42Y and the third conveyance motor 83Y at respective rotation speeds corresponding to the initial toner conveyance amount, and gradually increases the rotation speeds with an elapse of time until the rotation speeds reach the rotation speeds respectively corresponding to the normal toner conveyance amount.

At the stage when the second driving controller 151 receives the driving instruction from the second remaining amount notification receiver 157, the remaining amount of the toner contained in the toner bottle 30Y attached to the first bottle container 40Y is equal to or smaller than the lower limit value.

Therefore, the toner conveyance amount of the toner supplied from the toner bottle 30Y to the toner hopper 60Y is gradually decreased. Therefore, the sum of the toner conveyance amount of the toner supplied from the toner bottle 30Y attached to the first bottle container 40Y to the toner hopper 60Y and the toner conveyance amount of the toner supplied from the toner bottle 30Y attached to the second bottle container 50Y to the toner hopper 60Y can be made constant as much as possible.

When the state of the toner contained in the toner hopper 60Y received from the toner hopper controller 160 is switched from the second state to the first state, the second driving controller 151 stops the bottle motor 42Y of the second bottle container 50Y and the third conveyance motor 83Y. In a period during which the state of the toner contained in the toner hopper 60Y is the first state, the toner bottle 30Y and the third conveyance screw 82Y are not rotated. Therefore, the toner contained in the toner bottle 30Y attached to the second bottle container 50Y is not supplied from the toner bottle 30Y to the toner hopper 60Y.

The second remaining amount detector 153 detects a remaining amount of the toner contained in the toner bottle 30Y attached to the second bottle container 50Y. The second remaining amount detector 153 acquires a cumulative number of rotations of the bottle motor 42Y from the second driving controller 151 and calculates a cumulative number of rotations of the toner bottle 30Y. The second remaining amount detector 153 detects a toner consumption amount based on the cumulative number of rotations of the toner bottle 30Y, and detects a remaining amount based on the containing volume of the toner bottle 30Y and the consumption amount. The second remaining amount detector 153 outputs the detected toner remaining amount of the toner bottle 30Y attached to the second bottle container 50Y to the second remaining amount notifier 155.

When the toner remaining amount received from the second remaining amount detector 153 becomes equal to or smaller than the lower limit value being defined in advance, the second remaining amount notifier 155 notifies the first remaining amount notification receiver 147 included in the first conveyance controller 140 of the toner remaining amount of the toner bottle 30Y attached to the second bottle container 50Y.

The first remaining amount notification receiver 147 outputs a driving instruction to the first driving controller 141 in response to receiving a notification of the toner remaining amount of the toner bottle 30Y attached to the second bottle container 50Y from the second remaining amount notifier 155.

In response to receiving the driving instruction from the first remaining amount notification receiver 147, the first driving controller 141 operates similarly to a case in which the second driving controller 151 receives a driving instruction from the second remaining amount notification receiver 157, as described above.

Figure 9:
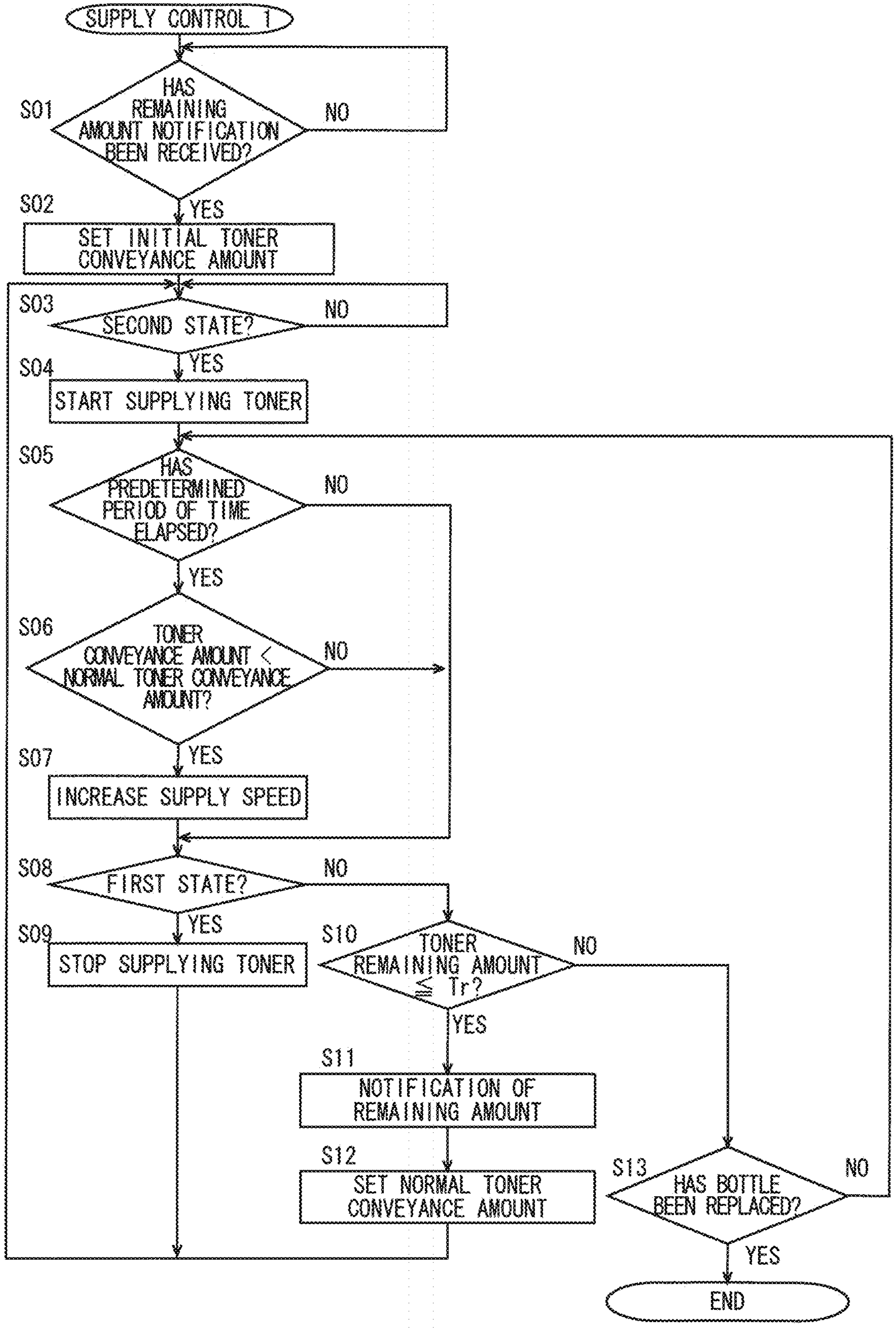
FIG. 9 is a flowchart illustrating one example of a flow of a supply control process.

FIG. 9 is a flowchart illustrating one example of a flow of a supply control process. The supply control process is a process executed by the CPU 111 included in the image forming apparatus 1 when the CPU 111 executes a supply control program stored in the ROM 113, the HDD 115 or the CD-ROM 118A. The supply control process indicates a first process in which the CPU 111 controls the first bottle container 40Y and the first conveyance path 70Y or a second process in which the CPU 111 controls the second bottle container 50Y and the second conveyance path 80Y. The CPU 111 executes the first process and the second process in parallel. Because the first process and the second process have different subjects to be controlled but have the same process content, the first process will be described here by way of example.

The CPU 111 determines whether a remaining amount notification has been received (step S01). A task in which the CPU 111 executes the first process waits until a remaining amount notification is received from a task in which the CPU 111 executes the second process (NO in the step S01). If a remaining amount notification is received, the process proceeds to the step S02.

In the step S02, an initial toner conveyance amount is set as a toner conveyance amount, and the process proceeds to the step S03. In the step S03, whether the state of a toner contained in the toner hopper 60Y is the second state is determined. When the output of the first toner sensor 66Y is switched from an ON signal to an OFF signal, the second state is detected. The process waits until the second state is detected (NO in the step S03). When the second state is detected (YES in the step S03), the process proceeds to the step S04.

In the step S04, a set toner conveyance amount of toner is supplied to the toner hopper 60Y. Specifically, the bottle motor 42Y of the first bottle container 40Y, the first conveyance motor 73Y and the second conveyance motor 78Y are rotated at the rotation speeds corresponding to the toner conveyance amount. In a case in which the process proceeds from the step S02, the rotation speeds of the bottle motor 42Y, the first conveyance motor 73Y and the second conveyance motor 78Y are the rotation speeds corresponding to the initial toner conveyance amount. In a case in which the process proceeds from the step S07, the rotation speeds of the bottle motor 42Y, the first conveyance motor 73Y and the second conveyance motor 78Y are the rotation speeds corresponding to the toner conveyance amount that has been increased from the initial toner conveyance amount. In a case in which the process proceeds from the step S12, the rotation speeds of the bottle motor 42Y, the first conveyance motor 73Y and the second conveyance motor 78Y are the rotation speeds corresponding to the normal toner conveyance amount.

In the step S05, whether a cumulative period of time during which the toner is supplied to the toner hopper 60Y after the toner conveyance amount is changed has exceeded a predetermined period of time is determined. If the cumulative period of time is equal to or larger than the predetermined period of time, the process proceeds to the step S06. If not, the process proceeds to the step S08. In the step S06, whether the toner conveyance amount is smaller than the normal toner conveyance amount Tv is determined. If the toner conveyance amount is smaller than the normal toner conveyance amount Tv, the process proceeds to the step S07. If not, the process proceeds to the step S08.

In the step S07, the CPU 111 increases the toner conveyance amount by a predetermined amount, and the process proceeds to the step S08. The process proceeds to the step S07 after the initial toner conveyance amount is set as the toner conveyance amount in the step S02 and a case in which it is determined that the toner conveyance amount is smaller than the normal toner conveyance amount in the step S06. In the step S07, the toner conveyance amount is increased by the predetermined amount each time a cumulative period of time in which the toner is supplied to the toner hopper 60Y after the toner conveyance amount is changed exceeds the predetermined period of time. The predetermined period of amount is a value defined in advance by an experiment or the like. Because the remaining amount of the toner bottle 30Y attached to the second bottle container 50Y is equal to or smaller than a threshold value Tr, the predetermined amount is defined according to a decrease amount by which the toner conveyance amount of the toner supplied from the toner bottle 30Y having the toner remaining amount being equal to or smaller than the threshold value Tr is decreased.

In the step S08, whether the state of the toner contained in the toner hopper 60Y is the first state is determined. When the output of the first toner sensor 66Y is switched from an OFF signal to an ON signal, the first state is detected. When the first state is detected, the process proceeds to the step S09. If not, the process proceeds to the step S10.

In the step S09, the CPU 111 stops the supply of the toner to the toner hopper 60Y, and the process returns to the step S03. Specifically, the bottle motor 42Y of the first bottle container 40Y, the first conveyance motor 73Y and the second conveyance motor 78Y are stopped.

In the step S10, the remaining amount of the toner contained in the toner bottle 30Y attached to the first bottle container 40Y is compared with the threshold value Tr. If the toner remaining amount is equal to or smaller than the threshold value Tr, the process proceeds to the step S11. If not, the process proceeds to the step S13.

In the step S11, notification of the remaining toner amount is made, and the process proceeds to the step S12. The task in which the CPU 111 executes the first process notifies the task in which the CPU 111 executes the second process of the remaining amount of the toner contained in the toner bottle 30Y attached to the first bottle container 40Y. In the step S12, the normal toner conveyance amount is set as a toner conveyance amount, and the process returns to the step S03.

In the step S13, whether the toner bottle 30Y attached to the first bottle container 40Y has been replaced is determined. If the toner bottle 30Y has been replaced, the process ends. If not, the process returns to the step S05.

Figure 10:
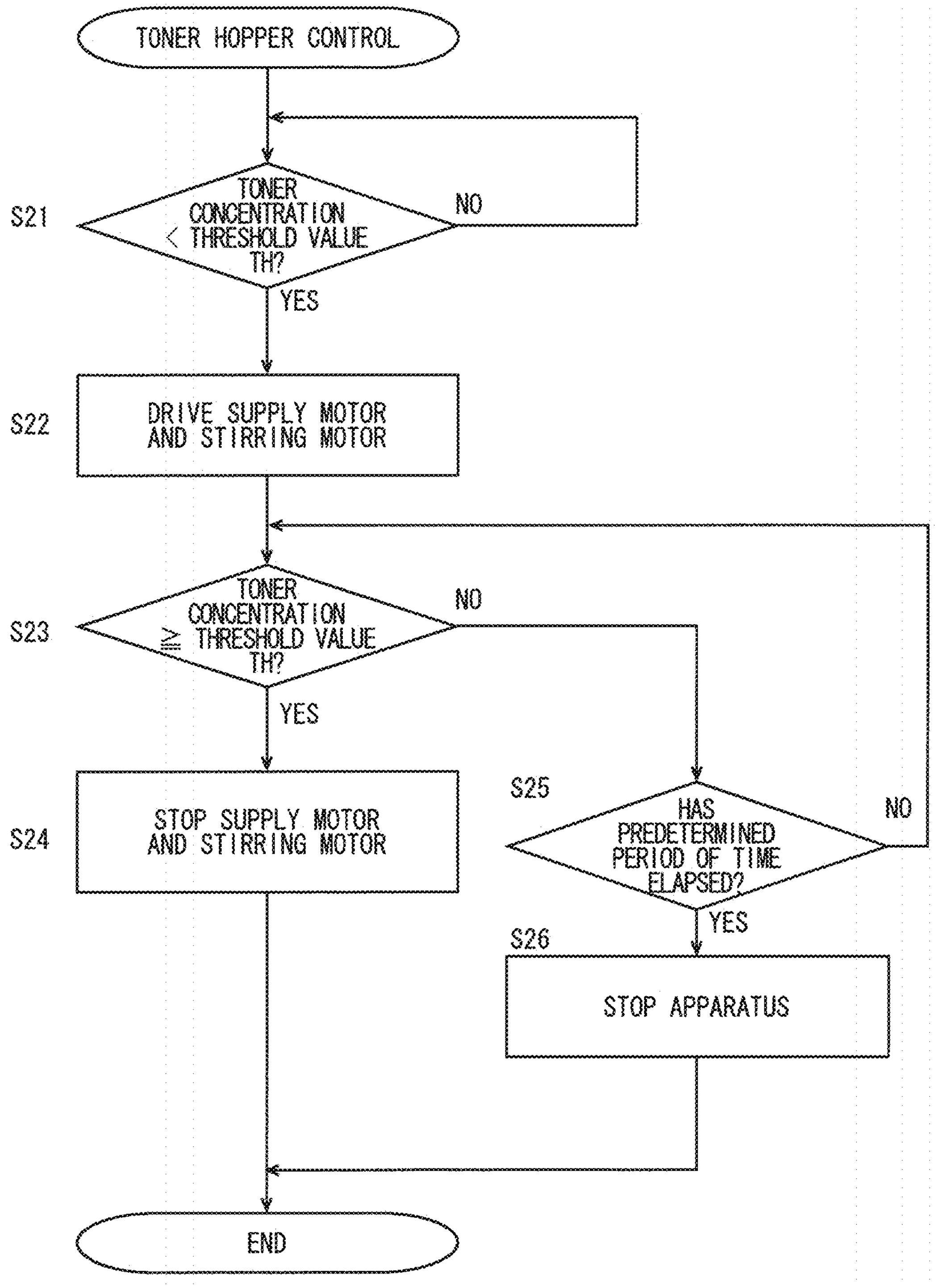
FIG. 10 is a flowchart illustrating one example of a flow of a toner hopper control process.

FIG. 10 is a flowchart illustrating one example of a flow of a toner hopper control process. The toner hopper control process is a process executed by the CPU 111 included in the image forming apparatus 1 when the CPU 111 executes a supply control program stored in the ROM 113, the HDD 115 or the CD-ROM 118A. With reference to FIG. 10, the CPU 111 compares a toner concentration with the threshold value TH (step S21). The toner concentration is detected based on an output value of the toner concentration sensor SEY. If the toner concentration is equal to or larger than the threshold value TH, the process waits (NO in the step S21). If the toner concentration is smaller than the threshold value TH (YES in the step S21), the process proceeds to the step S22. In a case in which the toner concentration is smaller than the threshold value TH, an amount of the toner contained in the developing device 21Y is smaller than a target toner amount.

In the step S22, the supply motor 61Y and the stirring motor 69Y are driven, and the process proceeds to the step S23. Thus, the supply screw 62Y is rotated, so that the toner is supplied from the toner hopper 60Y to the developing device 21Y.

In the step S23, the toner concentration is compared with the threshold value TH. If the toner concentration is smaller than the threshold value TH, the process proceeds to the step S25. If the toner concentration is equal to or larger than the threshold value TH, the process proceeds to the step S24. In a period during which the toner concentration is smaller than the threshold value TH, the supply motor 61Y and the stirring motor 69Y are continuously driven.

In the step S24, the supply motor 61Y and the stirring motor 69Y are stopped, and the process ends. Thus, the supply screw 62Y is no longer rotated, so that the toner is not supplied from the toner hopper 60Y to the developing device 21Y. Therefore, the toner concentration of the developer contained in the developing device 21Y is maintained within a predetermined range.

In the step S25, whether a predetermined period of time has elapsed since it is determined that the toner concentration is smaller than the threshold value TH. If the predetermined period of time has elapsed, the process proceeds to the step S26. If not, the process returns to the step S23.

In the step S26, the CPU 111 stops driving the image forming section 11, and the process ends. In a case in which the toner is not supplied to the toner hopper 60Y from either of the first bottle container 40Y and the second bottle container 50Y, the predetermined period of time elapses since it is determined that the toner concentration is smaller than the threshold value TH. In this case, the toner bottle 30Y is not attached to each of the first bottle container 40Y and the second bottle container 50Y or the toner is not contained in the attached toner bottle 30Y. Therefore, the image forming section 11 must be stopped, so that an image forming work is not performed with a toner not present in the developing device 21Y.

First Modification Example

Figure 11:
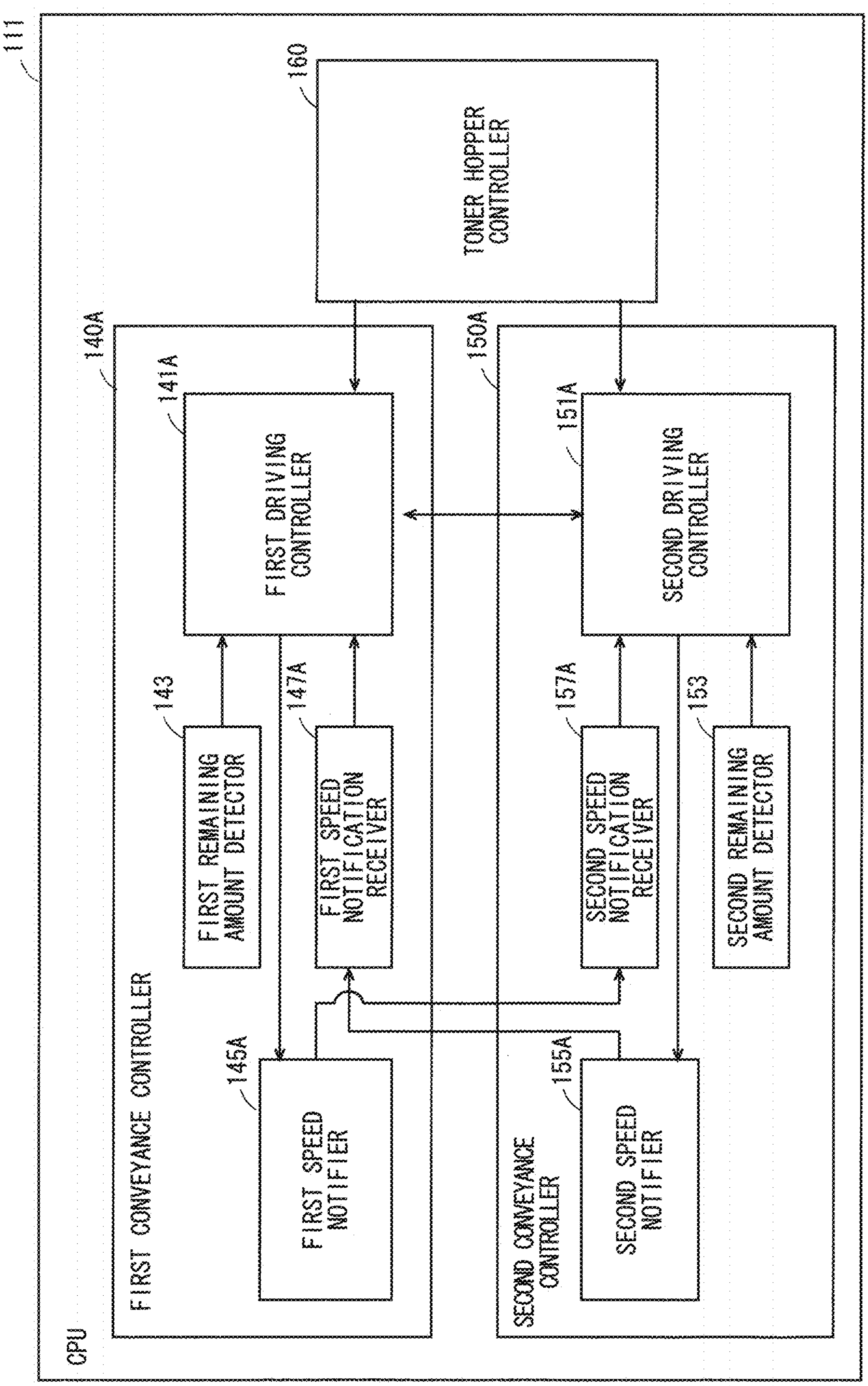
FIG. 11 is a block diagram illustrating one example of the functions of a CPU included in an image forming apparatus in a first modification example.

FIG. 11 is a block diagram illustrating one example of the functions of a CPU included in an image forming apparatus in a first modification example. The functions illustrated in FIG. 11 are different from the functions illustrated in FIG. 8 in that the first conveyance controller 140 and the second conveyance controller 150 are changed to a first conveyance controller 140A and a second conveyance controller 150A. Because the toner hopper controller 160 has the same functions as the toner hopper controller 160 illustrated in FIG. 8, the description will not be repeated here.

The first conveyance controller 140A controls the first bottle container 40Y and the first conveyance path 70Y. The second conveyance controller 150A controls the second bottle container 50Y and the second conveyance path 80Y. The first conveyance controller 140A and the second conveyance controller 150A supply toners to the toner hopper 60Y from the toner bottles 30Y respectively attached to the first bottle container 40Y and the second bottle container 50Y in parallel.

The first conveyance controller 140A includes a first driving controller 141A, a first remaining amount detector 143, a first speed notifier 145A and a first speed notification receiver 147A. Although having different subjects to be controlled, the second conveyance controller 150A and the first conveyance controller 140A have similar functions. The second conveyance controller 150A includes a second driving controller 151A, a second remaining amount detector 153, a second speed notifier 155A and a second speed notification receiver 157A. The second driving controller 151A corresponds to the first driving controller 141A, the second remaining amount detector 153 corresponds to the first remaining amount detector 143, the second speed notifier 155A corresponds to the first speed notifier 145A, and the second speed notification receiver 157A corresponds to the first speed notification receiver 147A.

The first remaining amount detector 143 detects a remaining amount of a toner contained in the toner bottle 30Y attached to the first bottle container 40Y, and outputs the toner remaining amount to the first driving controller 141A.

The first driving controller 141A determines a conveyance amount of the toner that is contained in the toner bottle 30Y attached to the first bottle container 40Y and is to be supplied from the toner bottle 30Y to the toner hopper 60Y. Hereinafter, a conveyance amount of the toner that is contained in the toner bottle 30Y attached to the first bottle container 40Y and is to be supplied from the toner bottle 30Y to the toner hopper 60Y is referred to as a first toner conveyance amount. In a case in which a toner remaining amount received from the first remaining amount detector 143 is equal to or smaller than the threshold value Tr, the first driving controller 141A determines the toner conveyance amount corresponding to the toner remaining amount as the first toner conveyance amount. The smaller the toner remaining amount, the larger the first toner conveyance amount determined by the first driving controller 141. In a case in which the toner remaining amount received from the first remaining amount detector 143 is larger than the threshold value Tr, the first driving controller 141A determines ½ of a normal toner conveyance amount as the first toner conveyance amount. The first driving controller 141A outputs the first toner conveyance amount to the first speed notifier 145A.

In a period during which the state of the toner contained in the toner hopper 60Y received from the toner hopper controller 160 is the second state, the first driving controller 141A drives the bottle motor 42Y of the first bottle container 40Y, the first conveyance motor 73Y and the second conveyance motor 78Y. The first driving controller 141A causes the bottle motor 42Y, the first conveyance motor 73Y and the second conveyance motor 78Y to be rotated at rotation speeds corresponding to the first toner conveyance amount. The respective rotation speeds of the bottle motor 42Y, the first conveyance motor 73Y and the second conveyance motor 78Y are proportional to the first toner conveyance amount. When the state of the toner contained in the toner hopper 60Y received from the toner hopper controller 160 is switched from the second state to the first state, the first driving controller 141A stops the bottle motor 42Y of the first bottle container 40Y, the first conveyance motor 73Y and the second conveyance motor 78Y.

The first speed notifier 145A notifies the second speed notification receiver 157A included in the second conveyance controller 150 of the first toner conveyance amount received from the first driving controller 141A.

In response to receiving a notification of the first toner conveyance amount from the first speed notifier 145A, the second speed notification receiver 157A outputs the first toner conveyance amount to the second driving controller 151A.

The second driving controller 151A determines a conveyance amount of the toner that is contained in the toner bottle 30Y attached to the second bottle container 50Y and is to be supplied from the toner bottle 30Y to the toner hopper 60Y. Hereinafter, a conveyance amount of the toner that is contained in the toner bottle 30Y attached to the second bottle container 50Y and is to be supplied from the toner bottle 30Y to the toner hopper 60Y is referred to as a second toner conveyance amount.

In a case in which receiving the first toner conveyance amount from the second speed notification receiver 157A, the second driving controller 151A determines a toner conveyance amount corresponding to the first toner conveyance amount as the second toner conveyance amount.

Specifically, the second driving controller 151A determines a value obtained when the first toner conveyance amount is subtracted from the normal toner conveyance amount as the second toner conveyance amount. The normal toner conveyance amount is a value equal to or smaller than the upper limit of a toner that can be received by the toner hopper 60Y per unit time. Therefore, it is possible to suppress an occurrence of over-capacity and overflow of a toner in the toner hopper 60Y.

In a case in which a remaining toner amount received from the second remaining amount detector 153 is equal to or smaller than the threshold value Tr, the second driving controller 151A determines the toner conveyance amount corresponding to the toner remaining amount of toner as the second toner conveyance amount. The smaller the toner remaining amount, the larger the second toner conveyance amount determined by the second driving controller 151. In a case in which the toner remaining amount received from the second remaining amount detector 153 is larger than the threshold value Tr, the second driving controller 151A determines ½ of a normal toner conveyance amount as the second toner conveyance amount.

The second speed notifier 155A notifies the first speed notification receiver 147A included in the first conveyance controller 140 of the second toner conveyance amount received from the second driving controller 151A. In response to receiving the notification of the second toner conveyance amount from the second speed notifier 155A, the first speed notification receiver 147A outputs the second toner conveyance amount to the first driving controller 141A.

In a case in which receiving the second toner conveyance amount from the first speed notification receiver 147A, the first driving controller 141A determines the toner conveyance amount corresponding to the second toner conveyance amount as the first toner conveyance amount. Specifically, the first driving controller 141A determines a value obtained when the second toner conveyance amount is subtracted from the normal toner conveyance amount as the first toner conveyance amount.

In a period during which the state of the toner contained in the toner hopper 60Y received from the toner hopper controller 160 is the second state, the second driving controller 151A drives the bottle motor 42Y of the second bottle container 50Y and the third conveyance motor 83Y. The second driving controller 151A causes the bottle motor 42Y and the third conveyance motor 83Y to be rotated at rotation speeds corresponding to the second toner conveyance amount. The respective rotation speeds of the bottle motor 42Y and the third conveyance motor 83Y are proportional to the second toner conveyance amount. When the state of the toner contained in the toner hopper 60Y received from the toner hopper controller 160 is switched from the second state to the first state, the second driving controller 151 stops the bottle motor 42Y of the second bottle container 50Y and the third conveyance motor 83Y.

Figure 12:
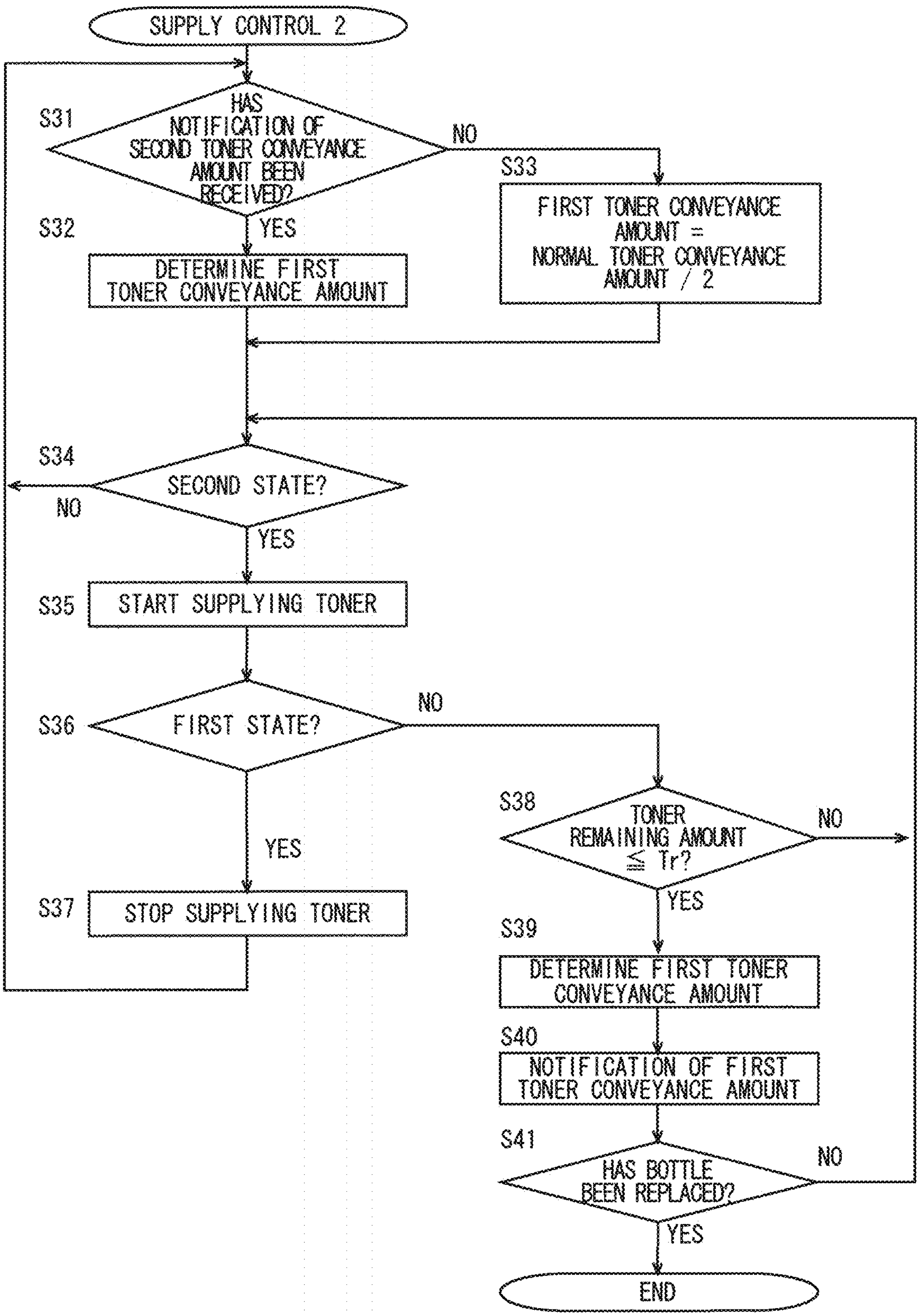
FIG. 12 is a flowchart illustrating one example of a flow of a supply control process in the first modification example.

FIG. 12 is a flowchart illustrating one example of a flow of a supply control process in the first modification example. The supply control process in the first modification example indicates a first process in which the CPU 111 controls the first bottle container 40Y and the first conveyance path 70Y or a second process in which the CPU 111 controls the second bottle container 50Y and the second conveyance path 80Y. The CPU 111 executes the first process and the second process in parallel. Because the first process and the second process have different subjects to be controlled but have the same process content, the first process will be described here by way of example.

The CPU 111 determines whether a notification in regard to a second toner conveyance amount has been received (step S31). The process waits until a task in which the CPU 111 executes the first process receives the second toner conveyance amount from a task in which the CPU 111 executes the second process (NO in the step S31). If the second toner conveyance amount is received, the process proceeds to the step S32.

In the step S32, a first toner conveyance amount is determined, and the process proceeds to the step S34. The first toner conveyance amount corresponding to the second toner conveyance amount received in the step S31 is determined. Specifically, a value obtained when the second toner conveyance amount is subtracted from the normal toner conveyance amount is determined as the first toner conveyance amount. In the step S33, the first toner conveyance amount is set to the half of the normal toner conveyance amount, and the process proceeds to the step S34.

In the step S34, whether the state of a toner contained in the toner hopper 60Y is the second state is determined. When the output of the first toner sensor 66Y is switched from an ON signal to an OFF signal, the second state is detected. If the second state is detected, the process proceeds to step S36. If not, the process returns to the step S31.

In the step S35, the first toner conveyance amount of a toner is supplied to the toner hopper 60Y. Specifically, the CPU 111 causes the bottle motor 42Y of the first bottle container 40Y, the first conveyance motor 73Y and the second conveyance motor 78Y to be rotated at the rotation speeds corresponding to the first toner conveyance amount. In a case in which the process proceeds from the step S32, the respective rotation speeds of the bottle motor 42Y, the first conveyance motor 73Y and the second conveyance motor 78Y are the rotation speeds corresponding to the first toner conveyance amount set in the step S32. In a case in which the process proceeds from the step S33, the respective rotation speeds of the bottle motor 42Y, the first conveyance motor 73Y and the second conveyance motor 78Y are the rotation speeds corresponding to the half of the normal toner conveyance amount.

In the step S36, whether the state of the toner contained in the toner hopper 60Y is the first state is determined. When the output of the first toner sensor 66Y is switched from an OFF signal to an ON signal, the first state is detected. When the first state is detected, the process proceeds to the step S37. If not, the process proceeds to the step S38.

In the step S37, the CPU 111 stops the supply of the toner to the toner hopper 60Y, and the process returns to the step S31. Specifically, the CPU 111 stops the bottle motor 42Y of the first bottle container 40Y, the first conveyance motor 73Y and the second conveyance motor 78Y.

In the step S38, the remaining amount of a toner contained in the toner bottle 30Y attached to the first bottle container 40Y is compared with the threshold value Tr. If the remaining amount of the toner is equal to or smaller than the threshold value Tr, the process proceeds to the step S39. If not, the process proceeds to the step S34.

In the step S39, the first toner conveyance amount is determined, and the process proceeds to the step S40. The toner conveyance amount corresponding to the remaining amount of the toner contained in the toner bottle 30Y is determined as the first toner conveyance amount. In the step S40, notification in regard to the first toner conveyance amount is made, and the process proceeds to the step S41. The task in which the CPU 111 executes the first process notifies the task in which the CPU 111 executes the second process of the first toner conveyance amount determined in the step S39. In the step S41, whether the toner bottle 30Y attached to the first bottle container 40Y has been replaced is determined. If the toner bottle 30Y has been replaced, the process ends. If not, the process returns to the step S34.

Second Modification Example

Figure 13:
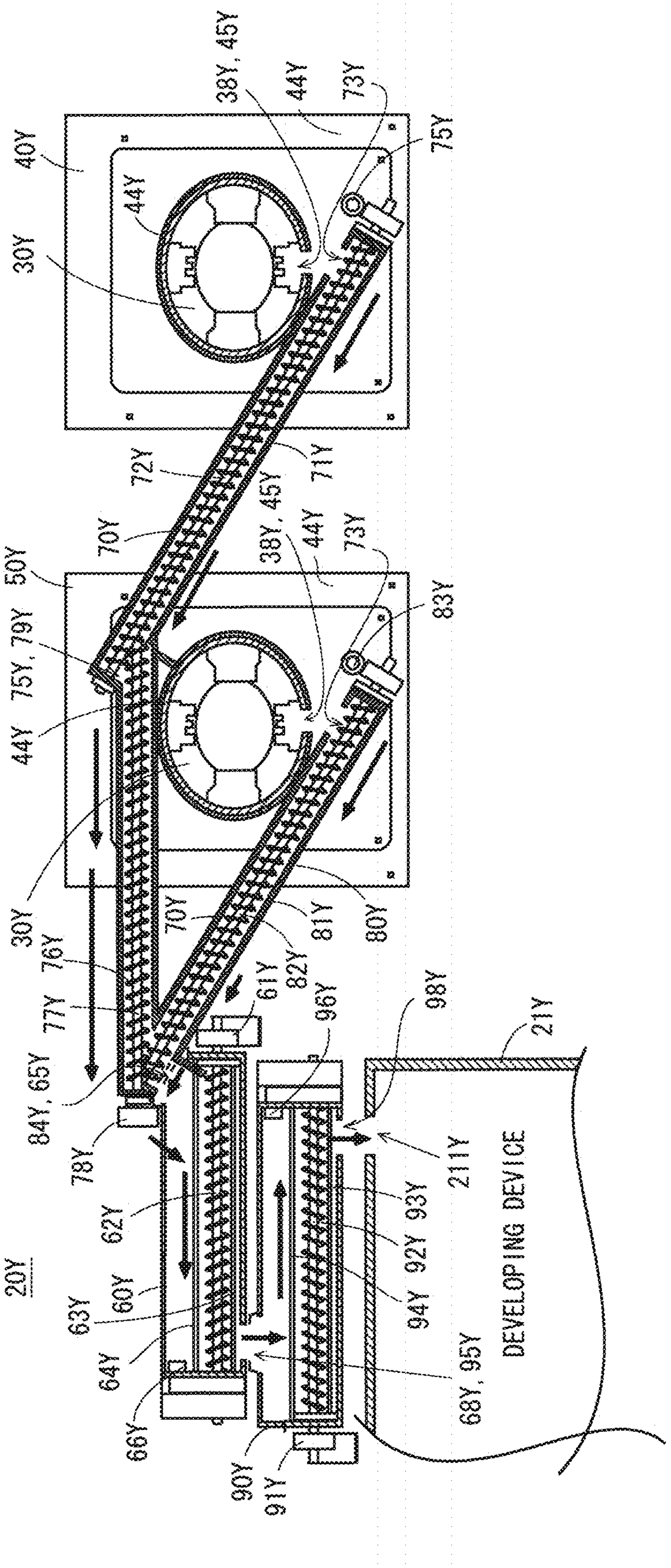
FIG. 13 is a cross sectional view of an image forming unit in a second modification example.

In an image forming section 11 in a second modification example, a rear toner hopper 90Y is provided between the toner hopper 60Y and the developing device 21Y. FIG. 13 is a cross sectional view of an image forming unit in a second modification example. FIG. 13 illustrates the cross section taken along the line A-A of FIG. 2. With reference to FIG. 13, the rear toner hopper 90Y has the similar configuration and function to those of the toner hopper 60Y, except that the rear toner hopper 90Y can contain a smaller volume of toner than the toner hopper 60Y.

Figure 14:
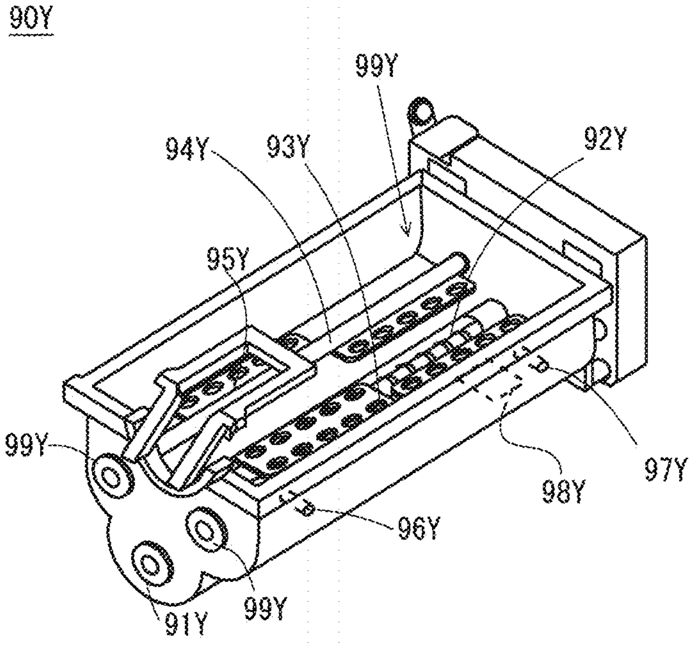
FIG. 14 is a perspective view of a rear toner hopper.
Figure 15:
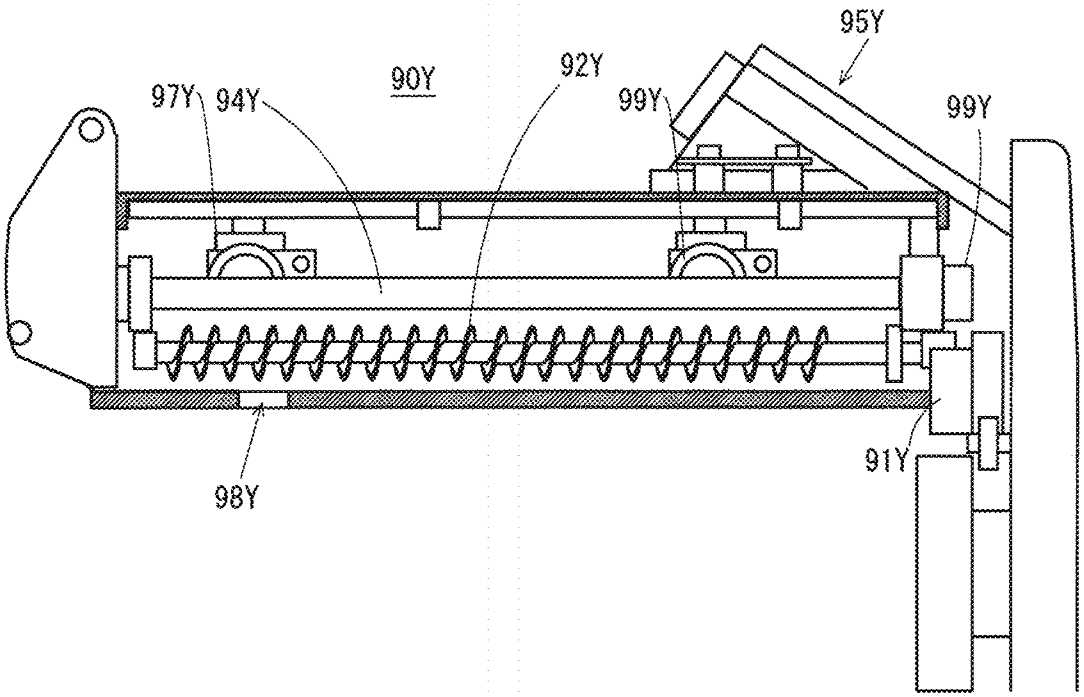
FIG. 15 is a cross sectional view of the rear toner hopper.

FIG. 14 is a perspective view of a rear toner hopper. FIG. 15 is a cross sectional view of the rear toner hopper. In FIG. 14 and FIG. 15, some members are not illustrated in order to describe the inner configuration of the rear toner hopper 90Y.

With reference to FIG. 14 and FIG. 15, the rear toner hopper 90Y has a housing similarly to the toner hopper 60Y. In the housing, an opening 95Y that upwardly opens an inner space is formed, and a discharge port 98Y that downwardly opens the inner space is formed in the end portion opposite to the opening 95Y in the conveyance direction of a roll sheet R in the bottom portion.

Further, the rear toner hopper 90Y is arranged such that its longitudinal direction is parallel to the conveyance direction of the roll sheet R. Similarly to the toner hopper 60Y, the rear toner hopper 90Y includes a supply motor 91Y, a supply screw 92Y, two stirring members 93Y, 94Y and a stirring motor 99Y.

The housing, the opening 95Y, the discharge port 98Y, the supply motor 91Y, the supply screw 92Y, the two stirring members 93Y, 94Y and the stirring motor 99Y included in the rear toner hopper 90Y correspond to the housing, the opening 65Y, the discharge port 68Y, the supply motor 61Y, the supply screw 62Y, the two stirring members 63Y, 64Y and the stirring motor 69Y included in the toner hopper 60Y, respectively.

As illustrated in FIG. 13, the opening 95Y overlaps with the discharge port 68Y of the toner hopper 60Y in plan view. A gap is formed between the discharge port 68Y and the opening 95Y. Therefore, the inner space of the rear toner hopper 90Y communicates with the inner space of the toner hopper 60Y through the opening 95Y and the discharge port 68Y.

In the developing device 21Y, the receiving port 211Y that is an opening for outwardly opening the inner space is formed. The discharge port 98Y overlaps with part of the supply screw 92Y in plan view and overlaps with the receiving port 211Y formed in the developing device 21Y in plan view. Below the discharge port 98Y, a gap is formed between the discharge port 98Y and the receiving port 211Y.

Further, similarly to the toner hopper 60Y, the rear toner hopper 90Y has a first toner sensor 96Y and a second toner sensor 97Y in the inner space.

The distance from the first toner sensor 96Y to the opening 95Y is shorter than the distance from the second toner sensor 97Y to the opening 95Y. The distance from the second toner sensor 97Y to the discharge port 98Y is shorter than the distance from the first toner sensor 96Y to the discharge port 98Y.

The toner hopper 60Y and the rear toner hopper 90Y are controlled by the toner hopper controller 160 illustrated in FIG. 8 and FIG. 11. The toner hopper controller 160 controls the toner hopper 60Y and the rear toner hopper 90Y. The toner hopper controller 160 detects a toner concentration based on an output value of the toner concentration sensor SEY included in the developing device 21Y. The toner hopper controller 160 drives the supply motor 91Y and the stirring motor 99Y included in the rear toner hopper 90Y in response to a toner concentration falling below the threshold value TH, and stops the supply motor 91Y and the stirring motor 99Y in response to a toner concentration becoming equal to or larger than the threshold value TH.

In a period during which the supply motor 91Y is driven, because the supply screw 92Y is rotated, a toner is supplied from the rear toner hopper 90Y to the developing device 21Y. In a period during which a toner concentration is equal to or larger than the threshold value TH, because the supply motor 91Y is not driven, a toner is not supplied to the developing device 21Y. Therefore, the toner concentration of a developer contained in the developing device 21Y is maintained equal to or smaller than the threshold value TH.

The toner hopper controller 160 detects the state of the toner contained in the rear toner hopper 90Y based on respective output values of the first toner sensor 96Y and the second toner sensor 97Y included in the rear toner hopper 90Y. Specifically, the toner hopper controller 160 detects the first state when the respective output values of the first toner sensor 96Y and the second toner sensor 97Y of the rear toner hopper 90Y are ON signals, detects the second state when the output value of the first toner sensor 96Y is an OFF signal and the output value of the second toner sensor 97Y is an ON signal, and detects the third state when the respective output values of the first toner sensor 96Y and the second toner sensor 97Y are OFF signals.

The toner hopper controller 160 drives the supply motor 61Y and the stirring motor 69Y included in the toner hopper 60Y in a period during which the state of the toner contained in the rear toner hopper 90Y is the second state, and stops the supply motor 61Y and the stirring motor 69Y included in the toner hopper 60Y in response to a change in state of the toner contained in the rear toner hopper 90Y from the second state to the first state or the third state.

In a period during which the supply motor 61Y is driven, because the supply screw 62Y is rotated, a toner is supplied from the toner hopper 60Y to the rear toner hopper 90Y. Because the supply motor 61Y is not rotated in a period during which the state of the toner contained in the rear toner hopper 90Y is the first state or the third state, the toner is not supplied to the rear toner hopper 90Y. Therefore, an amount of the toner contained in the rear toner hopper 90Y can be maintained within a predetermined range.

In the second modification example, because the rear toner hopper 90Y is arranged between the toner hopper 60Y and the developing device 21Y, it is possible to reduce a temporal change in amount of the toner contained in the rear toner hopper 90Y. Therefore, because an amount of the toner contained in the rear toner hopper 90Y does not rapidly vary, it is possible to prevent a toner conveyance amount of the toner supplied from the rear toner hopper 90Y to the developing device 21Y from rapidly varying. Therefore, it is possible to prevent an amount of the toner contained in the developing device 21Y from rapidly varying. As a result, it is possible to suppress degradation of the quality of toner images formed in the developing device 21Y.

Other Embodiments

While the two toner bottles 30Y are attached to the developing device 21Y by way of example in the image forming section 11 in the above-mentioned embodiment, the present invention is not limited to this. Three or more toner bottles 30Y may be attached to the developing device 21Y. The same applies to a developing device 21M, a developing device 21C, a developing device 21K and a developing device 21W as it applies to the developing device 21Y.

As described above, in the image forming apparatus 1 of the present embodiment, the developing devices 21Y that develops a latent image formed on the photosensitive drum 22Y to form a toner image, and the first bottle container 40Y and the second bottle container 50Y that respectively contain two toner bottles 30 containing toners to be supplied to the developing device 21Y and being attachable to and detachable from the image forming section 11 are arranged. The two toner bottles 30Y that contain toners to be supplied to the developing device 21Y are arranged. Therefore, even when a toner contained in one toner bottle 30Y is reduced, a toner contained in the other toner bottle 30Y can be supplied. Therefore, it is possible to replace the one toner bottle 30Y while continuously forming toner images on a continuous sheet. Therefore, it is possible to continuously form toner images on a continuous sheet without degrading productivity.

Further, for the five developing devices 21Y, 21M, 21C, 21K, 21W containing toners of different colors, two toner bottles 30Y, two toner bottles 30M, two toner bottles 30C, two toner bottles 30K and two toner bottles 30W are respectively arranged. Therefore, it is possible to continuously form toner images formed with toners of a plurality of colors.

The same yellow toners are contained in the two toner bottles 30Y for the developing device 21Y, the same magenta toners are contained in the two toner bottles 30M for the developing device 21M, the same cyan toners are contained in the two toner bottles 30C for the developing device 21C, the same black toners are contained in the two toner bottles 30K for the developing device 21K, and the same white toners are contained in the two toner bottles 30W for the developing device 21W. Therefore, only the toners of the same color can be supplied to each of the five developing devices 21Y, 21M, 21C, 21K, 21W.

The first driving controller 141 and the second driving controller 151 control the first conveyance path 70Y and the second conveyance path 80Y to supply the toners contained in the two toner bottles 30Y to the developing device 21Y through the toner hopper 60Y. The supply of toner from the two toner bottles 30Y to the common toner hopper 60Y is switched by the first driving controller 141 and the second driving controller 151. Therefore, the toner can be supplied from at least one of the two toner bottles 30Y to the toner hopper 60Y.

The first driving controller 141 and the second driving controller 151 start the supply of toner from the other toner bottle 30Y in accordance with a toner remaining amount in the one toner bottle 30Y. Therefore, before the toner contained in the one toner bottle 30Y is no longer supplied to the toner hopper 60Y, the toner contained in the other toner bottle 30Y can be supplied to the toner hopper 60Y. Therefore, it is possible to suppress shortage of toner in the toner hopper 60Y.

Further, the first driving controller 141 and the second driving controller 151 start the supply of toner from the other toner bottle 30Y before the toner remaining amount in the one toner bottle 30Y reaches 0. Therefore, before the toner contained in the one toner bottle 30Y is no longer supplied to the toner hopper 60Y, the toner contained in the other toner bottle 30Y can be supplied to the toner hopper 60Y.

Further, the first driving controller 141 and the second driving controller 151 perform control so as to start the supply of a toner from the other toner bottle 30Y at an initial toner conveyance amount and gradually increase a toner conveyance amount. Therefore, in a case in which the toner conveyance amount of the toner contained in the one toner bottle 30Y and supplied to the toner hopper 90Y is decreased, the toner conveyance amount of the toner contained in the other toner bottle 30Y and supplied to the toner hopper 60Y is gradually increased. Therefore, the sum of the toner conveyance amounts supplied from the two toner bottles 30Y to the toner hopper 60Y can be maintained equal to or larger than a predetermined amount or more.

In the two toner bottles 30Y, the first conveyance path 70Y and the second conveyance path 80Y with respect to the toner hopper 60Y are respectively provided. The first conveyance path 70Y is driven by the first conveyance motor 73Y and the second conveyance motor 78Y, and the second conveyance path 80Y is driven by the third conveyance motor 83Y. Therefore, the toner contained in the one toner bottle 30Y can be supplied to the toner hopper 60Y independently of the toner contained in the other toner bottle 30Y.

The first toner sensor 66Y and the second toner sensor 67Y are arranged in the toner hopper 60Y. Therefore, it is possible to detect the upper limit and the lower limit of an amount of the toner contained in the toner hopper 60Y. Thus, it is possible to adjust the amount of the toner contained in the toner hopper 60Y.

Further, in the image forming section 11 in the second modification example, the rear toner hopper 90Y having a volume smaller than that of the toner hopper 60Y is arranged between the toner hopper 60Y and the developing device 21Y. Therefore, a variation in toner conveyance amount of the toner supplied from the toner hopper 60Y to the rear toner hopper 90Y is smaller than a variation in toner conveyance amount of the toner supplied to the toner hopper 60Y from the two toner bottles 30Y. Therefore, it is possible to reduce a variation in amount of the toner supplied to the developing device 21Y as much as possible, and degradation of the quality of toner images formed on the photosensitive drum 22Y is suppressed.

Further, in the image forming section 11 in the first modification example, the first driving controller 141A and the second driving controller 151A supply toners from the two toner bottles 30Y to the toner hopper 60Y in parallel. Therefore, even in a case in which a speed at which the toner contained in the one toner bottle 30Y is supplied is lower than a speed at which the toner is consumed per unit time by the developing device 21Y, the toner contained in the other toner bottle 30Y can be supplied. Therefore, it is possible to supply an amount of toner corresponding to an amount of toner consumed by the developing device 21Y to the developing device 21Y.

Further, in the image forming section 11 in the first modification example, the first driving controller 141A and the second driving controller 151A perform control such that the sum of the toner conveyance amounts of the toners supplied from the two toner bottles 30Y to the toner hopper 60Y at the same time is equal to or larger than a predetermined amount. Therefore, it is possible to prevent the toner conveyance amount of the toner to be supplied to the toner hopper 60Y from being excessive and prevent the toner from overflowing from the toner hopper 60Y.

Further, the sum of the toner volumes of the two toner bottles 30Y is a volume that enables printing to be continuously performed on a continuous sheet equal to or larger than 1000 m at a predetermined printing rate with both of the toner bottles 30Y filled up. In this case, it is possible to continuously form images at the predetermined printing rate on a continuous sheet of at least 1000 m. The predetermined printing rate is 15%.

Further, the sum of the toner volumes of the two toner bottles 30Y may be a volume that enables continuous printing on a continuous sheet equal to or larger than 3000 m at a predetermined printing rate with the both of the two toner bottles 30Y filled up. In this case, it is possible to continuously form images at the predetermined printing rate on a continuous sheet of at least 1000 m.

The toner volume indicating the volume of toner that can be contained in the toner hopper 60Y is equal to or smaller than the sum of the toner volumes of the two toner bottles 30Y. A toner volume corresponds to a toner weight.

Further, a toner volume that indicates the volume of toner that can be contained in the toner hopper 60Y is equal to or larger than the toner volume of the developing device 21Y.

Overview of Embodiments (Item 1) An image forming apparatus by which a toner image is formable on a continuous sheet, includes a developing device that develops a latent image formed on an image bearing member to form a toner image, and a toner container that contains a toner to be supplied to the developing device, and is attachable to and detachable from the image forming apparatus, wherein a plurality of the toner containers containing toners of a same color are arranged.

According to this aspect, a plurality of toner containers that contain toners to be supplied to the developing device that develops a latent image formed on an image bearing member to form a toner image are arranged. Therefore, even when an amount of a toner contained in one toner container is decreased, a toner contained in another toner container can be supplied. Therefore, it is possible to replace the one toner container while continuously forming toner images on a continuous sheet. As a result, it is possible to provide the image forming apparatus that can continuously forming toner images on a continuous sheet without degrading productivity.

(Item 2) The image forming apparatus according to item 1, wherein the developing device includes a plurality of developing devices respectively corresponding to toners of different colors, and the plurality of the toner containers are arranged with respect to each of the plurality of developing devices.

According to this aspect, a plurality of toner containers are arranged in each of the developing devices. Therefore, it is possible to continuously form toner images formed with toners of a plurality of colors.

(Item 3) The image forming apparatus according to item 1 or 2, wherein toners of a same color are contained in the plurality of the toner containers corresponding to the one developing device.

According to this aspect, toners of the same color are contained in the plurality of toner containers corresponding to the same developing device.

Therefore, it is possible to supply the toners of the same color to the developing device.

(Item 4) The image forming apparatus according to any one of items 1 to 3, wherein the plurality of the toner containers supply toners to the developing device through a common toner hopper, and the image forming apparatus further includes a switcher that switches supply of the toners that are supplied from the plurality of the toner containers to the common toner hopper.

According to this aspect, the toners contained in the plurality of respective toner containers are supplied to the developing device through the common toner hopper, and the supply of toner from the plurality of toner containers to the common toner hopper is switched. Therefore, it is possible to supply a toner from at least one of the plurality of toner containers to the toner hopper.

(Item 5) The image forming apparatus according to item 4, wherein in accordance with a toner remaining amount in one toner container, the switcher starts supply of a toner from another toner container.

According to this aspect, before a toner contained in one toner container is no longer supplied to the toner hopper, a toner contained in another toner container can be supplied to the toner hopper. Therefore, it is possible to suppress shortage of the toner in the toner hopper.

(Item 6) The image forming apparatus according to item 4, wherein before a toner remaining amount of one toner container reaches 0, the switcher starts supply of a toner from another toner container.

According to this aspect, before a toner contained in one toner container is no longer supplied to the toner hopper, a toner contained in another toner container can be supplied to the toner hopper.

(Item 7) The image forming apparatus according to item 6, wherein the switcher performs control so as to start supply of a toner from the another toner container at a predetermined amount and gradually increases a supply amount.

According to this aspect, in a case in which the conveyance amount of a toner that is contained in one toner container and is to be supplied to the toner hopper is decreased, the conveyance amount of a toner that is contained in another toner container and is to be supplied to the toner hopper is gradually increased. Therefore, the toner conveyance amount of the toners supplied to the toner hopper can be maintained equal to or larger than the predetermined amount.

(Item 8) The image forming apparatus according to any one of items 4 to 7, wherein a toner conveyer is provided in each of the plurality of the toner containers with respect to the common toner hopper, and the toner conveyer includes an independent driving source.

According to this aspect, the toner conveyer is provided in each of the plurality of toner containers with respect to the common toner hopper, and each toner conveyer includes an independent driving source. Therefore, a toner contained in one toner container can be supplied to the toner hopper independently of a toner contained in another toner container.

(Item 9) The image forming apparatus according to any one of items 4 to 8, wherein a plurality of toner remaining amount detection sensors are arranged in the common toner hopper.

According to this aspect, it is possible to detect the upper limit and the lower limit of the amount of a toner contained in the toner hopper. Therefore, it is possible to adjust the amount of the toner contained in the toner hopper.

(Item 10) The image forming apparatus according to any one of items 4 to 9, wherein the common toner hopper is referred to as a first toner hopper, and a second toner hopper having a volume smaller than that of the common toner hopper is arranged between the common toner hopper and the developing device.

According to this aspect, because the second toner hopper having a volume smaller than that of the common toner hopper is arranged between the common toner hopper and the developing device, a variation in toner conveyance amount of a toner supplied from the common toner hopper to the second toner hopper can be made smaller than a variation in toner conveyance amount of toners supplied from the plurality of toner containers to the common toner hopper. Therefore, it is possible to reduce a variation in toner conveyance amount of toners supplied to the developing device.

(Item 11) The image forming apparatus according to any one of items 1 to 10, wherein the plurality of the toner containers supply toners to the developing device through a common toner hopper, and supply toners to the common toner hopper at a same time.

According to this aspect, even in a case in which the amount of a toner to be supplied from one toner container is smaller than the amount of a toner to be consumed by the developing device, a toner contained in another toner container is supplied. Therefore, an amount of a toner to be consumed by the developing device can be supplied to the developing device.

(Item 12) The image forming apparatus according to any one of items 1 to 11, being controlled such that a sum of amounts of toners to be supplied from the plurality of the toner containers to the common toner hopper at a same time per unit time is equal to or smaller than a predetermined amount.

According to this aspect, it is possible to prevent the toner conveyance amount of a toner to be conveyed to the common toner hopper from being excessive and prevent the toner from overflowing from the toner hopper.

(Item 13) The image forming apparatus according to any one of items 1 to 11, being characterized in that a sum of toner volumes of the plurality of the toner containers is a volume that enables printing on a continuous sheet equal to or larger than 1000 m at a predetermined printing rate with all of the plurality of toner containers filled up.

According to this aspect, it is possible to continuously form images at the predetermined printing rate on a continuous sheet of at least 1000 m.

(Item 14) The image forming apparatus according to item 13, wherein the predetermined printing rate is 15%.

(Item 15) The image forming apparatus according to any one of items 1 to 12, being characterized in that a sum of toner volumes of the plurality of toner containers is a volume that enables printing on a continuous sheet equal to or larger than 3000 m.

According to this aspect, it is possible to continuously form images at the predetermined printing rate on a continuous sheet of at least 1000 m.

(Item 16) The image forming apparatus according to item 15, being characterized in that a toner volume of the common toner hopper is equal to or smaller than the sum of toner volumes of the plurality of the toner containers.

(Item 17) The image forming apparatus according to item 16, being characterized in that the toner volume of the common toner hopper is equal to or larger than a toner volume of the developing device.

(Item 18) The image forming apparatus according to item 15, wherein the toner volume corresponds to a toner weight.

Although embodiments of the present invention have been described and illustrated in detail, the disclosed embodiments are made for purpose of illustration and example only and not limitation. The scope of the present invention should be interpreted by terms of the appended claims.

What is claimed is:

1. An image forming apparatus by which a toner image is formable on a continuous sheet, comprising:
- a developing device that develops a latent image formed on an image bearing member to form a toner image; and
- a toner container that contains a toner to be supplied to the developing device, and is attachable to and detachable from the image forming apparatus, wherein
- a plurality of the toner containers containing toners of a same color are arranged, and
- the image forming apparatus further includes
  - a common toner hopper through which the plurality of the toner containers supply toners to the developing device, and
  - a switcher that switches supply of the toners that are supplied from the plurality of the toner containers to the common toner hopper,
- wherein before the toner contained in one toner container is not supplied to the common toner hopper by a status that the toner remaining amount of one toner container reaches 0, the switcher starts supply of a toner from another toner container.

2. The image forming apparatus according to claim 1, wherein
- the developing device includes a plurality of developing devices respectively corresponding to toners of different colors, and the plurality of the toner containers are arranged with respect to each of the plurality of developing devices.

3. The image forming apparatus according to claim 1, wherein
- toners of a same color are contained in the plurality of the toner containers corresponding to the one developing device.

4. The image forming apparatus according to claim 1, wherein in accordance with a toner remaining amount in one toner container, the switcher starts supply of a toner from another toner container.

5. The image forming apparatus according to claim 1, wherein
- the switcher performs control so as to start supply of a toner from the another toner container at a predetermined amount and gradually increases a supply amount.

6. The image forming apparatus according to claim 1, wherein a toner conveyer is provided in each of the plurality of the toner containers with respect to the common toner hopper, and the toner conveyer includes an independent driving source.

7. The image forming apparatus according to claim 1, wherein a plurality of toner remaining amount detection sensors are arranged in the common toner hopper.

8. The image forming apparatus according to claim 1, wherein the common toner hopper is referred to as a first toner hopper, and a second toner hopper having a volume smaller than that of the common toner hopper is arranged between the common toner hopper and the developing device.

9. The image forming apparatus according to claim 1, being characterized in that a sum of toner volumes of the plurality of the toner containers is a volume that enables printing on a continuous sheet equal to or larger than 1000 m at a predetermined printing rate with all of the plurality of toner containers filled up.

10. The image forming apparatus according to claim 9, wherein the predetermined printing rate is 15%.

11. The image forming apparatus according to claim 1, being characterized in that a sum of toner volumes of the plurality of toner containers is a volume that enables printing on a continuous sheet equal to or larger than 3000 m.

12. An image forming apparatus by which a toner image is formable on a continuous sheet, comprising:

a developing device that develops a latent image formed on an image bearing member to form a toner image; and a toner container that contains a toner to be supplied to the developing device, and is attachable to and detachable from the image forming apparatus, wherein a plurality of the toner containers containing toners of a same color are arranged, wherein the plurality of the toner containers supply toners to the developing device through a common toner hopper, and supply toners to the common toner hopper at a same time.

13. The image forming apparatus according to claim 12, being controlled such that a sum of amounts of toners to be supplied from the plurality of the toner containers to the common toner hopper at a same time per unit time is equal to or smaller than a predetermined amount.

14. The image forming apparatus according to claim 12, being characterized in that a toner volume of the common toner hopper is equal to or smaller than a sum of toner volumes of the plurality of the toner containers.

15. The image forming apparatus according to claim 14, being characterized in that the toner volume of the common toner hopper is equal to or larger than a toner volume of the developing device.

16. The image forming apparatus according to claim 11, wherein the toner volume corresponds to a toner weight.

* * * * *